(12) United States Patent
Holtcamp et al.

(10) Patent No.: US 11,186,601 B2
(45) Date of Patent: Nov. 30, 2021

(54) METALLOCENE COMPOUNDS HAVING APPENDED LEWIS ACIDS AND POLYMERIZATION THEREWITH

(71) Applicant: ExxonMobil Chemical Patents Inc., Baytown, TX (US)

(72) Inventors: Matthew W. Holtcamp, Huffman, TX (US); Charles J. Harlan, Houston, TX (US); Subramaniam Kuppuswamy, Mont Belvieu, TX (US); Matthew S. Bedoya, Humble, TX (US); Kevin A. Stevens, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 156 days.

(21) Appl. No.: 16/552,352

(22) Filed: Aug. 27, 2019

(65) Prior Publication Data

US 2020/0071349 A1 Mar. 5, 2020

Related U.S. Application Data

(60) Provisional application No. 62/724,381, filed on Aug. 29, 2018.

(51) Int. Cl.
*C07F 17/00* (2006.01)
*C08F 4/6592* (2006.01)
*C08F 210/16* (2006.01)

(52) U.S. Cl.
CPC .......... *C07F 17/00* (2013.01); *C08F 4/65925* (2013.01); *C08F 4/65927* (2013.01); *C08F 210/16* (2013.01)

(58) Field of Classification Search
CPC ...................................................... C07F 17/00
See application file for complete search history.

(56) References Cited

U.S. PATENT DOCUMENTS

| | | | |
|---|---|---|---|
| 5,942,459 A | 8/1999 | Sugano et al. | |
| 5,962,718 A | 10/1999 | Reetz et al. | 556/51 |
| 6,936,675 B2 | 8/2005 | Szul et al. | |
| 8,076,259 B2 | 12/2011 | Richter et al. | |
| 8,975,427 B2 | 3/2015 | Harlan et al. | |
| 2013/0225772 A1 | 8/2013 | Willocq et al. | |

FOREIGN PATENT DOCUMENTS

| | | | |
|---|---|---|---|
| WO | WO2014/052200 | 4/2014 | C08F 10/14 |

OTHER PUBLICATIONS

Schock et al. (1988) "Organometallic thermochemistry. Metal hydrocarbyl, hydride, halide, carbonyl, amide, and alkoxide bond enthalpy relationships and their implications in pentamethylcyclopentadienyl and cyclopentadienyl complexes of zirconium and hafnium," Journal of the American Chemical Society, v.110(23), pp. 7701-7715.

Lund et al. (1990) "Rapid and efficient procedure for the synthesis of monocyclopentadienyl complexes of hafnium and zirconium," Organometallics, v.9(9), pp. 2426-2427.

Parks et al. (1995) "Bis(pentafluorophenyl)borane: Synthesis, Properties, and Hydroboration Chemistry of a Highly Electrophilic Borane Reagent," Angew. Chem. Int. Ed. Engl., v.34(7), pp. 809-811.

Hill, M. et al. (2004) "Formation of a bifunctional zirconocene complex that favours intramolecular-B(C6F5)(2) addition to a Cp ring over sigma-ligand abstraction," Chemical Communications, v.4(8), pp. 1020-1021.

Spence, R. E. et al. (1995) "Toward One-Component Group 4 Homogeneous Ziegler-Natta Olefin Polymerization Catalysts: Hydroboration of Zirconium Bisalkyls with Pendant 2-Propenyl Groups using [(C6F5)2BH]2," Organometallics, v. 14(9), pp. 4617-4624.

Burlakov, V. V. et al. (2010) "Reactions of the Five-Membered Hafnacyclocumulene Cp2Hf(n4-t-Bu-C4-t-Bu) with the Lewis Acids Tris(pentafluorophenyl) Borane and Diisobutylaluminum Hydride," *Organometallics*, v.29(10), pp. 2367-2371.

Do, L. H. (2016) "Upgrading Polyethylene: Copolymerization of Ethylene and Polar Vinyl Monomers Facilitated by Lewis Acid Appended Ni and Pd Catalysts," *Amer. Chem. Soc.*, 5 pg. PRF Annual Report.

(Continued)

*Primary Examiner* — Caixia Lu

(57) ABSTRACT

This invention relates to metallocene compounds represented by the formula:

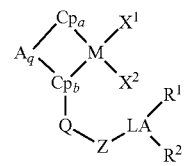

catalyst systems comprising said metallocene compound and an activator or a reaction product of the metallocene compound with the at least one activator, and polymerization processes using such metallocene compounds and activators, where $Cp_a$ and $Cp_b$ are optionally-substituted cyclopentadienyl rings; A is bridging group; q is zero or 1; Q is O, $O(CR^3R^4)_m$, $(CR^3R^4)_mO$, or $(CR^3R^4)_m$; m is 0 to 18; Z is $(CR^3R^4)_2$; LA is a Lewis acid; M is a transition metal; $X^1$ and $X^2$ are independently $R^5$ or $OR^5$; $R^1$ and $R^2$ are independently selected from optionally-substituted hydrocarbyl groups; $R^3$ and $R^4$ are independently selected from the group consisting of H, halogen, and an optionally-substituted hydrocarbyl group; and $R^5$ is alkyl, aryl, perfluoroalkyl, or perfluoroaryl.

40 Claims, 1 Drawing Sheet

(56) References Cited

OTHER PUBLICATIONS

Tirfoin, R. et al. (2017) "Frustrated Lewis Pairs Incorporating the Bifunctional Lewis Acid 1,1'-fc{B($C_6F_5$)$_2$}$_2$: Reactivity Towards Small Molecules," *Dalton Trans.*, v.47, pp. 1588-1598.
Wang, X. et al. (2014) "Internal Adduct Formation of Active Intramolecular $C_4$-bridged Frustrated Phosphane/Borane Lewis Pairs," *J. Am. Chem. Soc.*, v.136(8), pp. 3293-3303.

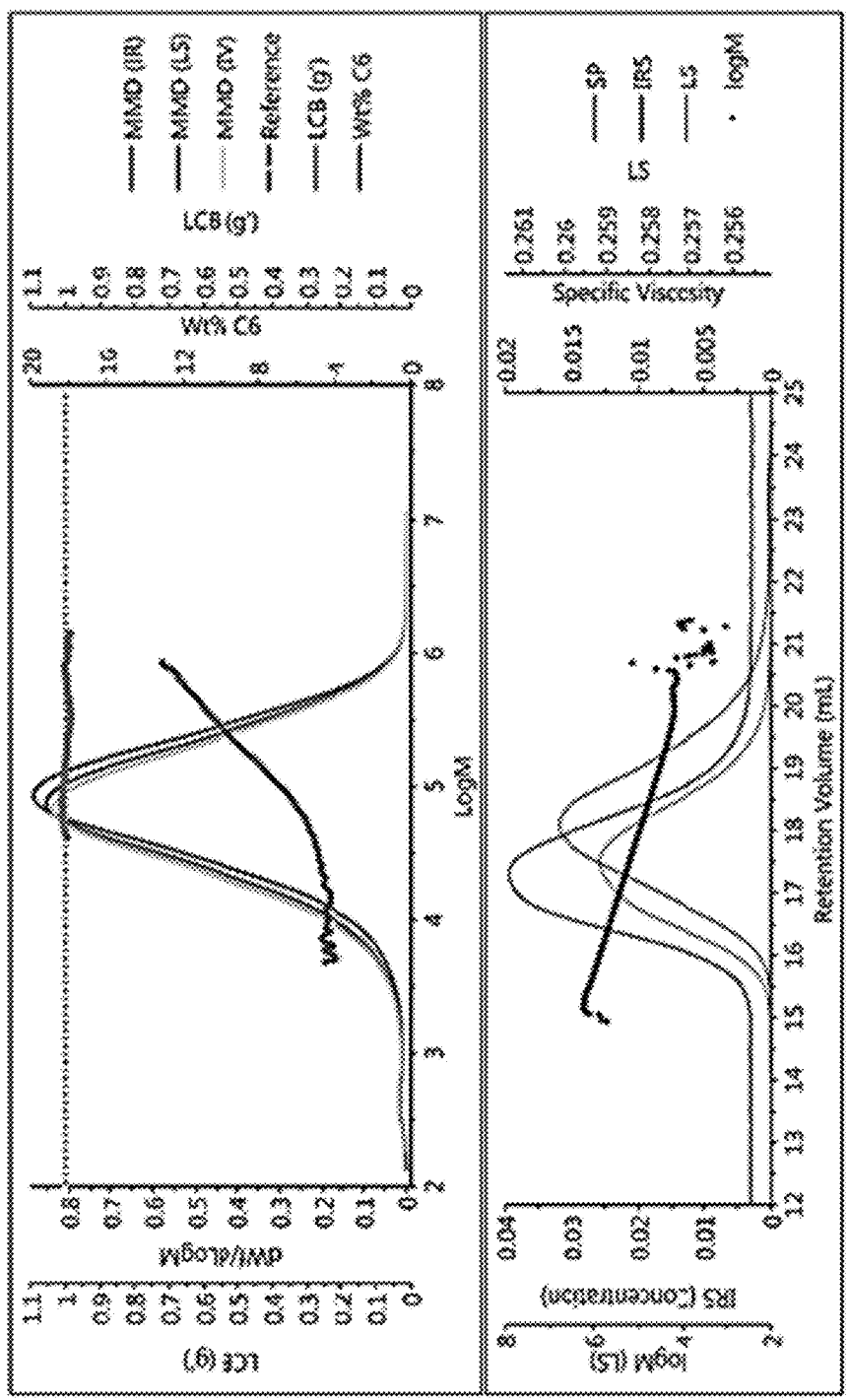

METALLOCENE COMPOUNDS HAVING APPENDED LEWIS ACIDS AND POLYMERIZATION THEREWITH

CROSS REFERENCE TO RELATED APPLICATIONS

This application claims priority to and the benefit of U.S. Provisional Application No. 62/724,381, filed Aug. 29, 2018, the disclosure of which is incorporated herein by reference in its entirety.

FIELD

This invention relates to metallocene compounds and polymerization reactions using catalyst compositions comprising metallocene compounds.

BACKGROUND

A number of catalysts have been developed for preparing polyolefins. The choice of catalyst may aid in tailoring various polyolefin properties, such as molecular weight, branching, tacticity, crystallinity, melt index, and similar features. Some catalysts suitable for polymerizing olefins are multi-site catalysts, such as the traditional Ziegler-Natta catalyst system (i.e., $TiCl_4$/triethylaluminum or $TiCl_3$/diethylaluminum chloride). Metallocene catalysts, in contrast, while mechanistically related to the traditional Ziegler-Natta catalyst system, are usually catalytically active at only a single site.

Zirconium metallocene compounds have typically been the catalyst system of choice for conducting certain olefin polymerization reactions. Both "full sandwich" (i.e., Zr haptically bonded to two cyclopentadienyl rings) and "half sandwich" (i.e., Zr haptically bonded to only a single cyclopentadienyl ring) have been used in this regard. Incomplete haptic bonding to one or more cyclopentadienyl rings is also possible in some instances. At least two additional ligands are also coordinatively bonded non-haptically (i.e., σ-bonded) to the zirconium center in typical zirconium metallocene catalysts. Loss of one or more of the non-haptically bonded ligands is believed to activate zirconium metallocene compounds for conducting olefin polymerization.

Zirconium metallocene compounds frequently require exposure to an activator (i.e., a co-catalyst) in order to become catalytically active. The activator is believed to remove at least one of the non-haptically bonded ligands from the zirconium center to generate a catalytically active species with at least one open coordination site for bonding an olefin and/or a growing polymer chain. Activators for zirconium metallocene compounds include substances such as alumoxanes, particularly methylalumoxane (MAO). Some alumoxanes are rather expensive, and substantial alumoxane quantities are often needed to produce an active catalytic species. As such, the economic viability of zirconium metallocene catalysts can be problematic in certain instances.

Hafnium metallocene compounds (i.e., hafnocenes), when suitably activated, are often capable of producing higher molecular weight polyolefins compared to the corresponding zirconium metallocene compounds. In contrast to the ready activation of zirconium metallocene compounds, alumoxane activation is often much less effective for producing an active catalytic species from hafnium metallocene compounds. In the case of hafnium metallocene compounds, borane and borate activators may be successfully employed.

References of interest include: Lund, E. C. et al. (1990) "Rapid and Efficient Procedure for the Synthesis of Monocyclopentadienyl Complexes of Hafnium and Zirconium," *Organometallics*, v9(9), pp. 2426-2427; U.S. Pat. No. 8,975, 427; and Parks, D. J. et al. (1995) "Bis(pentafluorophenyl) borane: Synthesis, Properties, and Hydrocarbon Chemistry of a Highly Electrophilic Borane Reagent,"*Angew. Chem. Int. Ed. Engl.*, v34(7), pp. 809-811.

SUMMARY

This invention relates to compositions comprising metallocene compounds, such as hafnium or zirconium metallocene compounds. The metallocene compounds are represented by the formula:

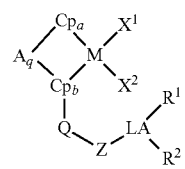

where:

$Cp_a$ and $Cp_b$ are optionally-substituted cyclopentadienyl rings;

A is an optional bridging group linking $Cp_a$ to $Cp_b$; q is zero or 1, indicating the presence or absence of a bridge;

Q is O, $O(CR^3R^4)_m$, $(CR^3R^4)_mO$, or $(CR^3R^4)_m$;

m is an integer ranging from 0 to 18; Z is $(CR^3R^4)_2$;

LA is a Lewis acid;

M is a transition metal haptically bonded to $Cp_a$ and $Cp_b$;

$X^1$ and $X^2$ are independently $R^5$ or $OR^5$;

$R^1$ and $R^2$ are independently selected from an optionally-substituted hydrocarbyl group having 1 to 20 carbon atoms, the optionally-substituted hydrocarbyl group being linear or branched, saturated or unsaturated, aliphatic or aromatic, and cyclic or acyclic;

$R^3$ and $R^4$ are independently selected from the group consisting of H, halogen, and an optionally-substituted hydrocarbyl group having 1 to 20 carbon atoms, the optionally-substituted hydrocarbyl group being linear or branched, saturated or unsaturated, aliphatic or aromatic, and cyclic or acyclic; and $R^5$ is alkyl, aryl, perfluoroalkyl, or perfluoroaryl.

This invention also relates to catalyst compositions. The catalyst compositions comprise at least one activator and a metallocene compound represented by the formula:

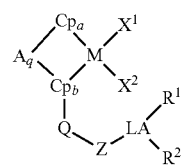

or a reaction product of the metallocene compound with the at least one activator, where:

$Cp_a$ and $Cp_b$ are optionally-substituted cyclopentadienyl rings;

A is an optional bridging group linking $Cp_a$ to $Cp_b$;

q is zero or 1, indicating the presence or absence of a bridge;

Q is O, $O(CR^3R^4)_m$, $(CR^3R^4)_mO$, or $(CR^3R^4)_m$;

m is an integer ranging from 0 to 18; Z is $(CR^3R^4)_2$;

LA is a Lewis acid;

M is a transition metal haptically bonded to $Cp_a$ and $Cp_b$;

$X^1$ and $X^2$ are independently $R^5$ or $OR^5$;

$R^1$ and $R^2$ are independently selected from an optionally-substituted hydrocarbyl group having 1 to 20 carbon atoms, the optionally-substituted hydrocarbyl group being linear or branched, saturated or unsaturated, aliphatic or aromatic, and cyclic or acyclic;

$R^3$ and $R^4$ are independently selected from the group consisting of H, halogen, and an optionally-substituted hydrocarbyl group having 1 to 20 carbon atoms, the optionally-substituted hydrocarbyl group being linear or branched, saturated or unsaturated, aliphatic or aromatic, and cyclic or acyclic; and $R^5$ is alkyl, aryl, perfluoroalkyl, or perfluoroaryl.

This invention also relates to polymerization processes employing metallocene compounds. The polymerization methods include providing an olefinic feed, and contacting a catalyst composition with the olefinic feed under polymerization reaction conditions. The catalyst compositions comprise at least one activator and a metallocene compound represented by the formula:

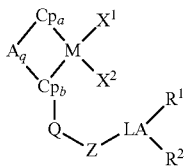

or a reaction product of the metallocene compound with the at least one activator, where:

$Cp_a$ and $Cp_b$ are optionally-substituted cyclopentadienyl rings; A is an optional bridging group linking $Cp_a$ to $Cp_b$; q is zero or 1, indicating the presence or absence of a bridge; Q is O, $O(CR^3R^4)_m$, $(CR^3R^4)_mO$, or $(CR^3R^4)_m$; m is an integer ranging from 0 to 18; Z is $(CR^3R^4)_2$; LA is a Lewis acid; M is a transition metal haptically bonded to $Cp_a$ and $Cp_b$; $X^1$ and $X^2$ are independently $R^5$ or $OR^5$; $R^1$ and $R^2$ are independently selected from an optionally-substituted hydrocarbyl group having 1 to 20 carbon atoms, the optionally-substituted hydrocarbyl group being linear or branched, saturated or unsaturated, aliphatic or aromatic, and cyclic or acyclic; $R^3$ and $R^4$ are independently selected from the group consisting of H, halogen, and an optionally-substituted hydrocarbyl group having 1 to 20 carbon atoms, the optionally-substituted hydrocarbyl group being linear or branched, saturated or unsaturated, aliphatic or aromatic, and cyclic or acyclic; and $R^5$ is alkyl, aryl, perfluoroalkyl, or perfluoroaryl.

BRIEF DESCRIPTION OF THE DRAWING

The following FIGURE is included to illustrate certain aspects of the present disclosure, and should not be viewed as an exclusive embodiment. The subject matter disclosed is capable of considerable modifications, alterations, combinations, and equivalents in form and function, as will occur to one of ordinary skill in the art and having the benefit of this disclosure.

The FIGURE shows a 4D GPC analysis of the polymerization product obtained in Example B using a metallocene catalyst of the present disclosure.

DETAILED DESCRIPTION

The present disclosure generally relates to polymerization and, more specifically, to metallocene compounds and olefin polymerizations conducted therewith.

Compositions comprising metallocene compounds with a Lewis acid appended covalently thereto are described in various embodiments of the present disclosure. The term "Lewis acid" may be used synonymously herein with the term "electron pair acceptor". The metallocene compounds described herein may be rendered active toward promoting olefin polymerization in the presence of a suitable activator, such as aluminum compounds (e.g., alkyl aluminum compounds or alumoxanes), boranes, or borates. Although any transition metal may be present, group 4 metallocene compounds, such as zirconium and hafnium metallocene compounds, having a Lewis acid covalently appended thereto can be especially desirable for promoting olefin polymerization reactions.

The Lewis acids covalently bonded to a cyclopentadienyl ring in the metallocene compounds of the present disclosure provide some structural and functional similarities to the activator substances that are presently employed for activating metallocene compounds toward olefin polymerization. Advantageously, by suitably appending a Lewis acid covalently to a metallocene compound, the Lewis acid may be used more efficiently for promoting formation of an active catalytic species. In some instances, a linker extending between the Lewis acid and the cyclopentadienyl ring may be chosen to be of a sufficient length and orientation so that the appended Lewis acid is positioned near the catalytic site at the metal center, thereby allowing the appended Lewis acid to function more efficiently in promoting formation of a catalytically active species as compared to a separately added activator. In some instances, the disposition of the Lewis acid may even open the possibility of the metallocene compounds becoming self-activated during an olefin polymerization process. In some or other embodiments, the metallocene compounds disclosed herein allow smaller amounts of additional activator to be used for promoting formation of an active catalytic species. Thus, the covalently appended Lewis acid in the metallocene compounds of the present disclosure may allow an externally added activator, such as an alumoxane, borane or borate, to be utilized more effectively. In the case of hafnium metallocene compounds, alumoxane activators may be considerably more active compared to metallocene compounds in which the Lewis acid is not present. By decreasing the amount of added activator, unfavorable polymerization reaction economics may be better addressed.

In addition, by incorporating a Lewis acid directly within a metallocene compound, as in the present disclosure, potential difficulties associated with handling sensitive reactive reagents during a polymerization reaction may be more effectively addressed, in comparison to separately adding an activator substance. By minimizing the direct use of air and/or moisture sensitive reagents in a polymerization process, decreased engineering cost and complexity may be realized. Further, syntheses of the metallocene compounds disclosed herein may be conducted readily at high yields in few synthetic steps, thereby providing effective utilization of sensitive and/or expensive reagents employed for introducing a Lewis acid into the metallocene compounds.

All numerical values within the detailed description and the claims herein are modified by "about" or "approximately" with respect to the indicated value, and take into account experimental error and variations that would be expected by a person having ordinary skill in the art. Unless otherwise indicated, room temperature is about 23° C.

As used in the present disclosure and claims, the singular forms "a," "an," and "the" include plural forms unless the context clearly dictates otherwise.

As used herein, Mn is number average molecular weight, Mw is weight average molecular weight, and Mz is z average molecular weight, wt. % is weight percent, and mol % is mole percent. Molecular weight distribution (MWD), also referred to as polydispersity index (PDI), is defined to be Mw divided by Mn. Unless otherwise noted, all molecular weight units (e.g., Mw, Mn, Mz) are g/mol (g mol$^{-1}$).

As used in the present disclosure and claims, Me is methyl, Et is ethyl, Pr is propyl, cPr is cyclopropyl, nPr is n-propyl, iPr is isopropyl, Bu is butyl, nBu is normal butyl, iBu is isobutyl, sBu is sec-butyl, tBu is tert-butyl, Oct is octyl, Ph is phenyl, Bn is benzyl, MAO is methylalumoxane, DIBALH is diisobutylaluminum hydride, and DME is dimethylether.

For the purposes of the present disclosure, the new numbering scheme for groups of the Periodic Table is used. In said numbering scheme, the groups (columns) are numbered sequentially from left to right from 1 through 18, excluding the f-block elements (lanthanides and actinides). Under this scheme, Hf and Zr are group 4 metals.

The term "hydrocarbon" refers to a class of compounds of hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different numbers of carbon atoms. The term "$C_n$" refers to hydrocarbon(s) or a hydrocarbyl group having n carbon atom(s) per molecule or group, wherein n is a positive integer. Such hydrocarbon compounds may be one or more of linear, branched, cyclic, acyclic, saturated, unsaturated, aliphatic, or aromatic.

The term "substituted" refers to replacement of at least one hydrogen atom or carbon atom with a heteroatom or heteroatom functional group. Heteroatoms may include, but are not limited to, B, O, N, S, P, F, Cl, Br, I, Si, Pb, Ge, Sn, As, Sb, Se, and Te. Heteroatom functional groups that may be present in substituted groups include, but are not limited to, functional groups such as O, S, S=O, S(=O)$_2$, NO$_2$, F, Cl, Br, I, NR$_2$, OR, SeR, TeR, PR$_2$, AsR$_2$, SbR$_2$, SR, BR$_2$, SiR$_3$, GeR$_3$, SnR$_3$, PbR$_3$, where R is a hydrocarbyl group or H. Suitable hydrocarbyl R groups may include alkyl, alkenyl, alkynyl, aryl, heteroaryl, cycloalkyl, heterocyclyl, and the like, any of which may be optionally-substituted.

For purposes of this invention and claims thereto, in relation to metallocene catalyst compounds, the term "substituted" means that a hydrogen or carbon has been replaced with a heteroatom or a heteroatom functional group, or where the cyclopentadienyl group (such as cyclopentadiene, indene, fluorene, etc.) has a hydrogen or carbon replaced with a heteroatom, a heteroatom functional group, or a hydrocarbyl group. For example, methyl cyclopentadiene (Cp) is a Cp group substituted with a methyl group.

The term "optionally-substituted" means that the item may be unsubstituted or substituted, e.g., may have at least one hydrogen atom or carbon atom replaced with a heteroatom or heteroatom functional group, or where the cyclopentadienyl group(s) (such as cyclopentadiene, indene, fluorene, etc.) has a hydrogen or carbon replaced with a heteroatom, a heteroatom functional group, or a hydrocarbyl group. For example, the term "optionally-substituted hydrocarbyl" refers to replacement of at least one hydrogen atom or carbon atom in a hydrocarbyl group with a heteroatom or heteroatom functional group. Heteroatoms may include, but are not limited to, B, O, N, S, P, F, Cl, Br, I, Si, Pb, Ge, Sn, As, Sb, Se, and Te. Heteroatom functional groups that may be present in substituted hydrocarbyl groups include, but are not limited to, functional groups such as O, S, S=O, S(=O)$_2$, NO$_2$, F, Cl, Br, I, NR$_2$, OR, SeR, TeR, PR$_2$, AsR$_2$, SbR$_2$, SR, BR$_2$, SiR$_3$, GeR$_3$, SnR$_3$, PbR$_3$, where R is a hydrocarbyl group or H. Suitable hydrocarbyl groups may include alkyl, alkenyl, alkynyl, aryl, heteroaryl, cycloalkyl, heterocyclyl, and the like, any of which may be optionally-substituted.

The terms "hydrocarbyl" and "hydrocarbyl group" are used interchangeably herein. The term "hydrocarbyl group" refers to any $C_1$-$C_{20}$ hydrocarbon group bearing at least one unfilled valence position when removed from a parent compound. Suitable "hydrocarbyl" and "hydrocarbyl groups" may be optionally-substituted. The term "hydrocarbyl group having 1 to about 20 carbon atoms" refers to an optionally-substituted moiety selected from a linear or branched $C_1$-$C_{20}$ alkyl, a $C_3$-$C_{20}$ cycloalkyl, a $C_6$-$C_{20}$ aryl, a $C_2$-$C_{20}$ heteroaryl, a $C_1$-$C_{20}$ alkylaryl, a $C_7$-$C_{20}$ arylalkyl, and any combinations thereof.

The terms "linear" or "linear hydrocarbon" refer to a hydrocarbon or hydrocarbyl group having a continuous carbon chain without side chain branching, in which the continuous carbon chain may be optionally-substituted.

The terms "cyclic" or "cyclic hydrocarbon" refer to a hydrocarbon or hydrocarbyl group having a closed carbon ring, which may be optionally-substituted.

The terms "branched" or "branched hydrocarbon" refer to a hydrocarbon or hydrocarbyl group having a linear carbon chain or a closed carbon ring, in which a hydrocarbyl side chain extends from the linear carbon chain or the closed carbon ring. Optional substitution may be present in the linear carbon chain, the closed carbon ring, or the hydrocarbyl side chain.

The terms "saturated" or "saturated hydrocarbon" refer to a hydrocarbon or hydrocarbyl group in which all carbon atoms are bonded to four other atoms, except in the case of an unfilled valence position being present in a hydrocarbyl group.

The terms "unsaturated" or "unsaturated hydrocarbon" refer to a hydrocarbon or hydrocarbyl group in which one or more carbon atoms are bonded to less than four other atoms. That is, the term "unsaturated" refers to a hydrocarbon or hydrocarbyl radical bearing one or more double and/or triple bonds.

The terms "aromatic" or "aromatic hydrocarbon" refer to a hydrocarbon or hydrocarbyl group having a cyclic arrangement of conjugated pi-electrons that satisfy the Hückel rule.

The term "alkyl" refers to a hydrocarbyl group having no unsaturated carbon-carbon bonds, and which may be optionally-substituted.

The term "aryl" is equivalent to the term "aromatic" as defined herein. The term "aryl" refers to both aromatic compounds and heteroaromatic compounds, which may be optionally-substituted. Both mononuclear and polynuclear aromatic compounds are encompassed by these terms.

The term "perfluoroalkyl" refers to an alkyl group that has at least a majority of its hydrogen atoms replaced with fluorine atoms, and more typically all of its hydrogen atoms replaced with fluorine atoms.

The term "perfluoroaryl" refers to an aryl group that has at least a majority of its hydrogen atoms replaced with fluorine atoms, and more typically all of its hydrogen atoms replaced with fluorine atoms.

Examples of saturated hydrocarbyl groups include, but are not limited to, methyl, ethyl, n-propyl, isopropyl, n-butyl, isobutyl, sec-butyl, tert-butyl, pentyl, iso-amyl, neopentyl, hexyl, octyl cyclopropyl, cyclobutyl, cyclopentyl, cyclohexyl, cyclooctyl, and the like, including their substituted analogues. Examples of unsaturated hydrocarbyl groups include, but are not limited to, ethenyl, propenyl, allyl, 1,4-butadienyl, cyclopropenyl, cyclobutenyl, cyclopentenyl, cyclohexenyl, cyclooctenyl and the like including their substituted analogues.

Examples of aromatic hydrocarbyl groups include, but are not limited to, phenyl, tolyl, xylyl, naphthyl, and the like. Heteroaryl and polynuclear heteroaryl groups may include, but are not limited to, pyridine, quinoline, isoquinoline, pyrimidine, quinazoline, acridine, pyrazine, quinoxaline, imidazole, benzimidazole, pyrazole, benzopyrazole, oxazole, benzoxazole, isoxazole, benzisoxazole, imidazoline, thiophene, benzothiophene, furan and benzofuran. Polynuclear aryl groups may include, but are not limited to, naphthalene, anthracene, indane, indene, and tetralin.

The term "alkylene" refers to a hydrocarbyl group bearing two open valences when removed from a parent compound. The alkylene may be cyclic, acyclic, linear, or branched.

The term "silylene" refers to a silicon atom or multiple silicon atoms bonded to two hydrocarbyl groups and having two open valences at the silicon atom(s) when removed from a parent compound.

The term "transition metal" refers to any atom from Groups 3-12 of the Periodic Table, inclusive of the lanthanides and actinide elements.

The term "cyclopentadienyl" refers to the anionic form of 1,3-dicyclopentadiene, in which any of the carbon atoms may be optionally-substituted with a hydrocarbyl group or a heteroatom functional group.

The term "haptically" refers to a delocalized bond formed between a transition metal and multiple atoms bearing conjugated pi-electrons.

The terms "alkene" and "olefin" are used synonymously herein. Similarly, the terms "alkenic" and "olefinic" are used synonymously herein. Unless otherwise noted, all possible geometric isomers are encompassed by these terms.

For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt. % to 55 wt. %, it is understood that the mer unit in the copolymer is derived from ethylene in the polymerization reaction and said derived units are present at 35 wt. % to 55 wt. %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like. An "ethylene polymer" or "ethylene copolymer" is a polymer or copolymer comprising at least 50 mole % ethylene derived units, a "propylene polymer" or "propylene copolymer" is a polymer or copolymer comprising at least 50 mole % propylene derived units, and so on.

According to various embodiments, compositions comprising metallocene compounds are described herein. More particularly, the metallocene compounds are represented by Formula 1 below.

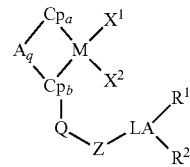

Formula 1

Referring to Formula 1, $Cp_a$ and $Cp_b$ are optionally-substituted cyclopentadienyl rings, including fused variants thereof (such as indene, fluorene, etc.); A is an optional bridging group linking $Cp_a$ to $Cp_b$, q is zero or 1; Q is O, $O(CR^3R^4)_m$, $(CR^3R^4)_mO$, or $(CR^3R^4)_m$; Z is $(CR^3R^4)_2$; LA is a Lewis acid; M is a transition metal, preferably Hf or Zr, haptically bonded to $Cp_a$ and $Cp_b$; m is an integer ranging from 0 to about 18 (e.g., m is 0, 1, 2, 3, 4, 5, 6, 7, 8, 9, 10, 11, 12, 13, 14, 15, 16, 17, or 18); $X^1$ and $X^2$ are independently $R^5$ or $OR^5$, $R^1$ and $R^2$ are independently selected from an optionally-substituted hydrocarbyl group having 1 to about 20 carbon atoms, where the optionally-substituted hydrocarbyl group may be linear or branched, saturated or unsaturated, aliphatic or aromatic, and cyclic or acyclic; $R^3$ and $R^4$ are independently selected from the group consisting of H, halogen, and an optionally-substituted hydrocarbyl group having 1 to about 20 carbon atoms, where the optionally-substituted hydrocarbyl group may be linear or branched, saturated or unsaturated, aliphatic or aromatic, and cyclic or acyclic; and $R^5$ is alkyl, aryl, perfluoroalkyl, or perfluoroaryl, any of which may be optionally-substituted.

$Cp_a$ and $Cp_b$ are preferably selected from substituted or unsubstituted cyclopentadienyl rings, including substituted or unsubstituted fused cyclopentadienyl rings, non-limiting examples of which include indenyl, fluorenyl and similar ring structures. Further non-limiting examples of suitable cyclopentadienyl rings include, for example, cyclopentaphenanthrenyl, benzindenyl, octahydrofluorenyl, cyclooctatetraenyl, cyclopentacyclododecenyl, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrenyl, thiophenoindenyl, and thiophenofluoreny. Hydrogenated, substituted, and/or heterocyclic variants of cyclopentadienyl rings are also suitable for use in the disclosure herein.

Substituted variants of cyclopentadienyl rings may include one or more optionally-substituted hydrocarbyl groups, according to various embodiments. Non-limiting examples of suitable hydrocarbyl groups that may be present upon cyclopentadienyl rings $Cp_a$ or $Cp_b$ include, for example, methyl, ethyl, propyl, butyl, pentyl, hexyl, neopentyl, cyclopentyl, cyclohexyl, benzyl, phenyl, methylphenyl, tert-butylphenyl, ethenyl, propenyl, butenyl, hexenyl groups, and the like, including all possible isomers thereof. Suitable substituted hydrocarbyl groups may include, for example, fluoromethyl, trifluoromethyl, fluoroethyl, difluoroethyl, iodopropyl, bromohexyl, chlorobenzyl, pentafluorophenyl, trimethylsilyl, trimethylgermyl, methyldiethylsilyl, tris(trifluoromethyl)silyl, methylbis(difluoromethyl)silyl, bromomethyldimethylgermyl, —CH$_2$-(Me$_3$)Si, and the like, including all possible isomers thereof. Other substituted hydrocarbyl groups may include those having an atom from Group 15 of the Periodic Table including, for example, dimethylamino, dimethylphosphino, diphenylamino, methylphenylphosphino, or an atom from Group 16 of the Periodic Table including, for example, methoxy, ethoxy, propoxy, phenoxy, thiomethoxy, and thioethoxy. Acyl, amino, alkylamino, arylamino, alkoxycarbonyl, aryloxycarbonyl, carbamoyl, and similar heteroatom functional groups may similarly be present in substituted cyclopentadienyl rings, according to various embodiments.

In some embodiments, Cp$_a$ is unsubstituted. In some or other embodiments, Cp$_b$ is unsubstituted, other than at the ring carbon atom bearing Q-Z. In still other embodiments, both Cp$_a$ and Cp$_b$ are unsubstituted, other than at the ring carbon atom of Cp$_b$ bearing Q-Z.

According to certain embodiments, Cp$_a$ is substituted with a methyl group at each of the ring carbon atoms. In other specific embodiments, Cp$_a$ is substituted at one ring carbon atom with a bridging group A and with a methyl group at each of the remaining ring carbon atoms. In still other specific embodiments, Cp$_a$ is substituted at one ring carbon atom with a bridging group A and with a methyl group of each of the remaining ring carbon atoms, and Cp$_b$ is unsubstituted, other than at one ring carbon atom bearing bridging group A and at one carbon atom bearing Q-Z.

Cyclopentadienyl rings Cp$_a$ and Cp$_b$ in the metallocene compounds defined by Formula 1 may be either bridged by A (q=1) or unbridged (q=0) when A is absent. Metallocene compounds of the present disclosure in which A is absent and Cp$_a$ and Cp$_b$ are unbridged (except for haptic bonding through M) are represented by Formula 2 below.

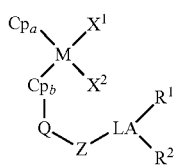

Formula 2 where Cp$_a$ and Cp$_b$, M, X$^1$, X$^2$, Q, Z, LA, R$^1$ and R$^2$ are as defined above. When cyclopentadienyl rings Cp$_a$ and Cp$_b$ are unbridged, the valence positions otherwise occupied by A on Cp$_a$ and Cp$_b$ at the ring carbon atoms are filled with H, a heteroatom functional group, or an optionally-substituted hydrocarbyl group, as defined above.

Bridging group A may contain a single bridging atom between Cp$_a$ and Cp$_b$ in some embodiments of the invention, or multiple (i.e., two or more) bridging atoms in other embodiments of the invention. In some embodiments of the invention, A is present (as a bridging group) and is preferably an alkylene or silylene group. Structures of metallocene compounds defined by Formula 1 and having an alkylene or silylene bridge are represented by Formulas 3 and 4, respectively,

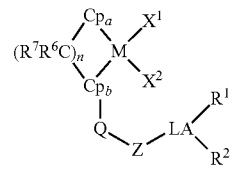

Formula 3

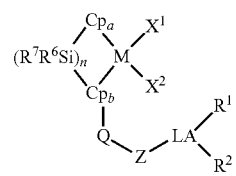

Formula 4 where Cp$_a$ and Cp$_b$, M, X$^1$, X$^2$, Q, Z, LA, R$^1$ and R$^2$ are as defined above; and in both Formulas 3 and 4, R$^6$ and R$^7$ are independently selected from an optionally-substituted hydrocarbyl group having 1 to about 20 carbon atoms (e.g. 1, 2, 3, 4, 5, 6, 7, 8, 9, 10, 11, 12, 13, 14, 15, 16, 17, 18, 19 or 20 carbon atoms), where the optionally-substituted hydrocarbyl group may be linear or branched, saturated or unsaturated, aliphatic or aromatic, and cyclic or acyclic. In Formulas 3 and 4, n is an integer that may range from 1 to about 6 (e.g. 1, 2, 3, 4, 5, or 6), or from 1 to about 4, preferably 1 or 2. In preferred embodiments of the invention, n is 1 or 2. Thus, alkylene bridges may contain single or multiple carbon atoms, according to various embodiments. Silylene bridges may similarly contain single or multiple silicon atoms. In still more specific embodiments, bridging group A may be (CH$_2$)$_n$, wherein n is 1 to 6, alternately 1 to 4, typically 1 or 2.

Particular examples of suitable bridging groups A may include, for example, methylene, ethylene, ethylidene, propylidene, isopropylidene, diphenylmethylene, 1,2-dimethylethylene, 1,2-diphenylethylene, 1,1,2,2-tetramethylethylene, cyclobutylidene, cyclopentylidene, cyclohexylidene, cycloheptylidene, cyclooctylidene, dimethylsilyl, diethylsilyl, methylethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, and di(t-butylphenyl)silyl. Corresponding structures in which one or two carbon atoms are replaced by nitrogen, oxygen, silicon, and/or germanium atoms are also contemplated by the present disclosure.

Other examples of suitable bridging groups A falling within the scope of Formula 1 include those in which A is O, O(CR$^6$R$^7$)$_n$, (CR$^6$R$^7$)$_n$O(CR$^6$R$^7$)$_n$, S, S(CR$^6$R$^7$)$_n$, (CR$_6$R$_7$)$_n$S (CR$^6$R$^7$)$_n$, (SiR$^6$R$^7$)$_n$, R$^6$R$^7$Si—O—SiR$^6$R$^7$, PR$^6$, or GeR$^6$R$^7$, where R$^6$ and R$^7$ are independently an optionally-substituted hydrocarbyl group having 1 to about 20 carbon atoms (e.g., 1, 2, 3, 4, 5, 6, 7, 8, 9, 10, 11, 12, 13, 14, 15, 16, 17, 18, 19 or 20 carbon atoms), the optionally-substituted hydrocarbyl group being linear or branched, saturated or unsaturated, aliphatic or aromatic, and cyclic or acyclic.

In any embodiment of the invention, R$^3$ and R$^4$ are independently selected from the group consisting of H, halogen, and an optionally-substituted hydrocarbyl group having 1 to about 20 carbon atoms (e.g., 1, 2, 3, 4, 5, 6, 7, 8, 9, 10, 11, 12, 13, 14, 15, 16, 17, 18, 19 or 20 carbon atoms), such as methyl, ethyl, propyl, butyl, butyl, pentyl, hexyl, heptyl, octyl, nonyl, decyl, undecyl, dodecyl, phenyl, and isomers thereof, the optionally-substituted hydrocarbyl group being linear or branched, saturated or unsaturated, aliphatic or aromatic, and cyclic or acyclic.

In any embodiment of the invention, $R^5$ is alkyl (such as methyl, ethyl, propyl, butyl, butyl, pentyl, hexyl, heptyl, octyl, nonyl, decyl, undecyl, dodecyl, phenyl, or an isomer thereof), aryl (such as phenyl), perfluoroalkyl, or perfluoroaryl (such as perfluorophenyl), any of which may be optionally-substituted.

In any embodiment of Formula 3 or 4, each $R^6$ and $R^7$ may be independently selected from methyl, ethyl, n-propyl, isopropyl, n-butyl, isobutyl, sec-butyl, tert-butyl, pentyl, iso-amyl, hexyl, octyl, cyclopropyl, cyclobutyl, cyclopentyl, cyclohexyl, cyclooctyl, ethenyl, propenyl, allyl, 1,4-butadienyl, cyclopropenyl, cyclobutenyl, cyclopentenyl, cyclohexenyl, cyclooctenyl, phenyl, tolyl, xylyl, naphthyl, and their substituted analogs.

$X^1$ and $X^2$ in all Formulas herein may be selected from among σ-bonded ligands that either convey innate catalytic activity to the metallocene compounds or are readily displaced to form a catalytically active species. In some embodiments, $X^1$ and $X^2$ may be independently selected from an optionally-substituted hydrocarbyl group having 1 to about 20 carbon atoms (e.g., 1, 2, 3, 4, 5, 6, 7, 8, 9, 10, 11, 12, 13, 14, 15, 16, 17, 18, 19 or 20 carbon atoms), where the optionally-substituted hydrocarbyl group may be linear or branched, saturated or unsaturated, aliphatic or aromatic, and cyclic or acyclic, or an oxyhydrocarbyl defined similarly. Oxyhydrocarbyl groups are σ-bonded to the transition metal center of the metallocene compound through an oxygen atom substitution on the hydrocarbyl group. The optional substitutions for both hydrocarbyl and oxyhydrocarbyl groups may include multiple fluorine atoms, according to various embodiments.

Suitable examples of $X^1$ and $X^2$ include alkyl, aryl, perfluoroalkyl, perfluoroaryl, alkoxy, aryloxy, perfluoroalkoxy, or perfluoroaryloxy groups. Alkyl, aryl, perfluoroalkyl, and perfluoroaryl ligands may possess innate catalytic activity. Alternately, such metallocene compounds may form as an intermediate in the course of forming a catalytically active species (e.g., through alumoxane or similar activation). Alkoxy, aryloxy, perfluoroalkoxy, and perfluoroaryloxy may undergo activation with ligand displacement to form a catalytically active species, as discussed in greater detail here below.

Further suitable examples of $X^1$ and $X^2$ may be any of $C_1$ to $C_{12}$ alkyl groups (such as methyl, ethyl, propyl, butyl, butyl, pentyl, hexyl, heptyl, octyl, nonyl, decyl, undecyl, dodecyl, and the isomers thereof), $C_2$ to $C_{12}$ alkenyl groups, $C_3$ to $C_8$ cycloalkyl groups, $C_6$ to $C_{12}$ aryl groups (such as phenyl), $C_7$ to $C_{20}$ alkylaryl groups, $C_1$ to $C_{12}$ alkoxy groups, $C_6$ to $C_{16}$ aryloxy groups, $C_7$ to $C_{16}$ alkylaryloxy groups, $C_1$ to $C_{12}$ haloalkyl groups, $C_6$ to $C_{12}$ haloaryl groups, $C_1$ to $C_{12}$ perfluoroalkyl groups, $C_6$ to $C_{12}$ perfluoroaryl groups, $C_1$ to $C_{12}$ haloalkoxy groups, $C_6$ to $C_{12}$ haloaryloxy groups, $C_1$ to $C_{12}$ perfluoroalkoxy groups, $C_6$ to $C_{12}$ perfluoroaryloxy groups, and the like. In particular embodiments of the present disclosure, $X^1$ and $X^2$ may both be pentafluorophenoxy.

Haloalkoxy, haloaryloxy, perfluoroalkoxy, and perfluoroaryloxy groups may be derived from the corresponding haloalcohols or halophenols. Illustrative haloalcohols that may be used to introduce $X^1$ and $X^2$ in the metallocene compounds of the present disclosure include, but are not limited to, fluoromethanol; chloromethanol; bromomethanol; iodomethanol; difluoromethanol; dichloromethanol; dibromomethanol; diiodomethanol; trifluoromethanol; trichloromethanol; tribromomethanol; triiodomethanol; 2,2,2-trifluoroethanol; 2,2,2-trichloroethanol; 2,2,2-tribromoethanol; 2,2,2-triiodoethanol; 2,2,3,3,3-pentafluoropropanol; 2,2,3,3,3-pentachloropropanol; 2,2,3,3,3-pentabromopropanol; 2,2,3,3,3-pentaiodopropanol; 2,2,2-trifluoro-1-trifluoromethylethanol; 2,2,2-trichloro-1-trichloromethylethanol; 2,2,2-tribromo-1-tribromomethylethanol; 2,2,2-triiodo-1-triiodomethylethanol; 1,1,1,3,3,3-hexafluoro-2-trifluoromethylpropanol; 1,1,1,3,3,3-hexachloro-2-trichloromethylpropanol; and 1,1,1,3,3,3-hexabromo-2-tribromomethylpropanol; 1,1,1,3,3,3-hexaiodo-2-triiodomethylpropanol. Illustrative halophenols that may be used to introduce $X^1$ and $X^2$ in the metallocene compounds of the present disclosure include, but are not limited to, 2-fluorophenol; 3-fluorophenol; 4-fluorophenol; 2-chlorophenol; 3-chlorophenol; 4-chlorophenol; 2-bromophenol; 3-bromophenol; 4-bromophenol; 2-iodophenol; 3-iodophenol; 4-iodophenol; 2,6-difluorophenol; 3,5-difluorophenol; 2,6-dichlorophenol; 3,5-dichlorophenol; 2,6-dibromophenol; 3,5-dibromophenol; 2,6-diiodophenol; 3,5-diiodophenol; 2,4,6-trifluorophenol; 2,4,6-trichlorophenol; 2,4,6-tribromophenol; 2,4,6-triiodophenol; pentafluorophenol; pentachlorophenol; pentabromophenol; pentaiodophenol; 2-(trifluoromethyl)phenol; 3-(trifluoromethyl)phenol; 4-(trifluoromethyl)phenol; 2,6-di(trifluoromethyl)phenol; 3,5-di(trifluoromethyl)phenol; and 2,4,6-tri(trifluoromethyl)phenol. In some embodiments, the halophenol can be pentafluorophenol, thereby leading to incorporation of pentafluorophenoxy groups in the metallocene compounds as $X^1$ and $X^2$.

Lewis acid LA may be appended to $Cp_b$ through a two-atom or longer chain, including at least two carbon atoms and optionally incorporating heteroatoms and/or branching. According to Formulas 1, 2, 3 and 4, the two-atom or longer chain may be defined by Q-Z, wherein Q and Z are defined as above. In some embodiments, Q may be an alkylene or oxyalkylene group, in which the number of carbon atoms in the alkylene or oxyalkylene group is defined by m, where m may range from 0 to about 12 or from 1 to about 4. In more specific embodiments of the present disclosure, Q is $(CH_2)_m$, and m ranges from 0 to about 12 or from 1 to about 4.

Z is a two-carbon alkylene group, optionally bearing hydrocarbyl branching or functional group branching. According to some embodiments, Z is derived from an alkene group appended to Q that is reacted to introduce Lewis acid LA in the metallocene compounds, as described in further detail herein below. In some embodiments, Z comprises a terminal alkene. In still more specific embodiments, Z is $(CH_2)_2$.

In still more specific embodiments of the present disclosure, Q is $(CH_2)_m$ and Z is $(CH_2)_2$. In such embodiments, m ranges from 0 to about 12 (e.g., m is 1, 2, 3, 4, 5, 6, 7, 8, 9, 10, 11, or 12), or from 1 to about 4 (e.g., m is 1, 2, 3, or 4). Accordingly, in certain embodiments of the present disclosure, Q-Z may be $(CH_2)_j$, wherein j is an integer ranging from 2 to 14 (e.g., j is 2, 3, 4, 5, 6, 7, 8, 9, 10, 11, 12, 13, or 14), or from 3 to 12, or from 4 to 10, or from 6 to 8. Formula 5 represents the structure of a metallocene compound of the present disclosure in which m is zero and Z is $CH_2$,

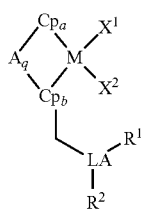

Formula 5 where $Cp_a$ and $Cp_b$, A, q, M, $X^1$, $X^2$, LA, and $R^1$ and $R^2$ are as defined above.

According to various embodiments of the present disclosure, the Lewis acid incorporated in the metallocene compounds herein may be an atom from Group 13 of the Periodic Table. Typically the Lewis acid is aluminum or boron. Aluminum or boron atoms may be readily incorporated in the metallocene compounds via hydroalumination or hydroboration reactions, as discussed hereinafter.

In more preferred embodiments of any of the formulas herein, $R^1$ and $R^2$ may be selected from any of $C_1$ to $C_{20}$ alkyl groups (such as methyl, ethyl, propyl, butyl, butyl, pentyl, hexyl, heptyl, octyl, nonyl, decyl, undecyl, dodecyl, and the isomers thereof), $C_3$ to $C_8$ cycloalkyl groups, $C_6$ to $C_{12}$ aryl groups (such as phenyl), $C_7$ to $C_{20}$ alkylaryl groups, $C_1$ to $C_{12}$ haloalkyl groups, $C_6$ to $C_{12}$ haloaryl groups, $C_1$ to $C_{12}$ perfluoroalkyl groups, and $C_6$ to $C_{12}$ perfluoroaryl groups, and the like.

In still more particular embodiments of the invention, Lewis acid LA may be aluminum and $R^1$ and $R^2$ may be any $C_1$ to $C_{20}$ alkyl groups (such as methyl, ethyl, propyl, butyl, butyl, pentyl, hexyl, heptyl, octyl, nonyl, decyl, undecyl, dodecyl, and the isomers thereof), which may be an isobutyl group in some embodiments. In other particular embodiments of the present disclosure, Lewis acid LA may be boron and $R^1$ and $R^2$ may be any $C_1$ to $C_{20}$ alkyl group (such as methyl, ethyl, propyl, butyl, butyl, pentyl, hexyl, heptyl, octyl, nonyl, decyl, undecyl, dodecyl, and the isomers thereof), $C_6$ to $C_{12}$ aryl group (such as phenyl), $C_1$ to $C_{12}$ haloalkyl group, or $C_6$ to $C_{12}$ haloaryl group. In certain embodiments, Lewis acid LA may be boron and $R^1$ and $R^2$ may be pentafluorophenyl.

Any transition metal that is capable of forming a haptic bond to $Cp_a$ and $Cp_b$ may be present in the metallocene compounds described herein. Suitable transition metals may include, for example, Sc, Ti, Zr, Hf, V, Nb, Ta, Mn, Re, Fe, Ru, Os, Co, Rh, Ir, and Ni. Preferably, the oxidation state of the selected transition metal is 0 to +7, and is preferably oxidation state of +3 or +4, preferably +4. The ligands bound to the transition metal and the oxidation state of the transition metal may be selected such that the metallocene compounds are electrically neutral, unless otherwise indicated.

In more specific embodiments of the present disclosure, particularly suitable transition metals may be selected from zirconium (Zr) and hafnium (Hf). Zr and Hf metallocene compounds may be particularly desirable for catalyzing polymerization of an olefinic feed, as discussed elsewhere herein. In still more specific embodiments, the transition metal may be hafnium. In some or other more specific embodiments, the oxidation state of Zr or Hf in the metallocene compounds disclosed herein may be a +4 oxidation state.

Accordingly, specific metallocene compounds encompassed by the present disclosure may be selected from among one or more of the following compounds shown structurally in Formulas 6, 7, 8 and 9 (M=Zr or Hf; $R^1$ and $R^2$ defined as above). In particular embodiments of Formulas 6, 7, 8 and 9 M is Hf, LA is Al, and $R^1$ and $R^2$ are isobutyl; or M is Hf, LA is B, and $R^1$ and $R^2$ are pentafluorophenyl.

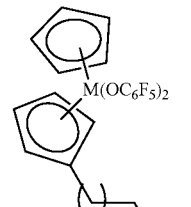

Formula 6

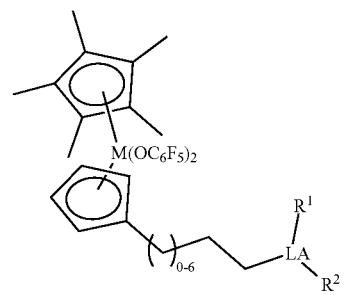

Formula 7

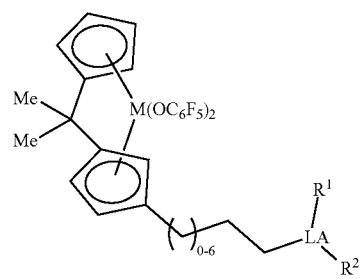

Formula 8

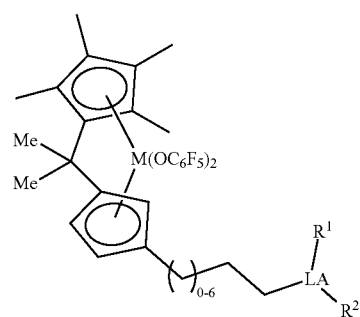

Formula 9

The metallocene compounds described hereinabove may be synthesized in high yields via a short sequence of synthetic steps, as outlined in brief in Schemes 1 and 2 below. Scheme 1 depicts the synthesis of metallocene compounds in which bridging group A is absent, and Scheme 2 depicts the synthesis of the corresponding bridged metallocene compounds (where $Cp_a$, $Cp_b$, Q, M are as defined as above.)

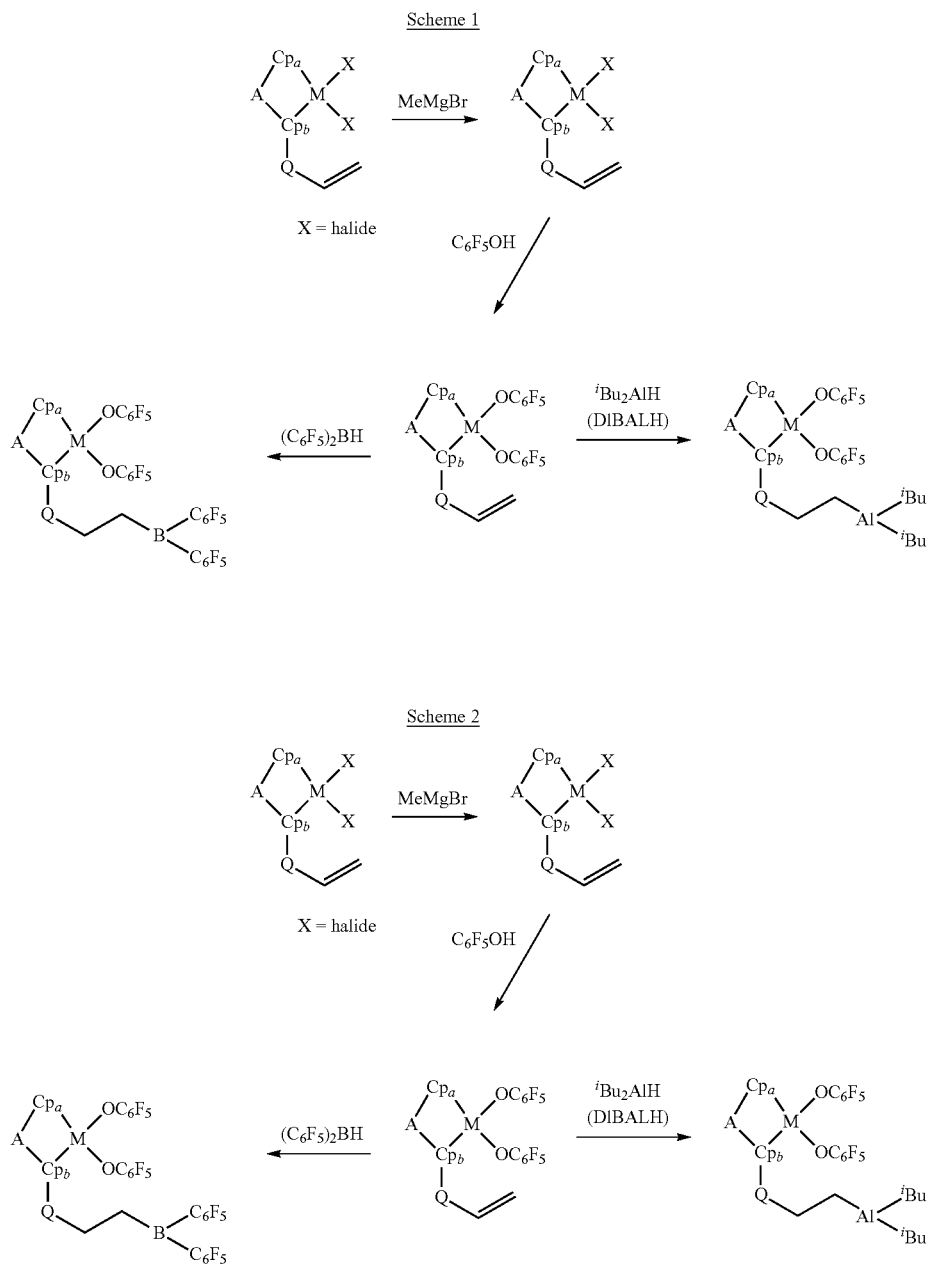

Referring to Schemes 1 and 2, bridged or unbridged cyclopentadienyl compounds bearing an alkene group on $Cp_b$ may be synthesized by standard methods and reacted to form a metallocene compound bearing two halide ligands bound to the transition metal center. The halide ligands may then be exchanged for methyl ligands in a nucleophilic displacement reaction using either methyl lithium or methylmagnesium bromide. Other alkyl groups may be exchanged using a corresponding hard organometallic reagent bearing the alkyl group. Thereafter, the methyl ligands may be exchanged for pentafluorophenoxy ligands in a second nucleophilic displacement reaction. The appended alkene in the resulting bis-pentafluorophenoxy metallocene compounds may then be reacted either through hydroalumination or hydroboration to introduce a Lewis acid site (either Al or B) appended to $Cp_b$ by an alkylene or functionalized alkylene spacer, when Q is $(CR_6R_7)_m$.

The pentafluorophenoxy ligands that are bonded to the transition metal center prior to performing hydroboration or hydroalumination are compatible with the reagents used for performing these types of reactions and remain bonded while performing each type of reaction. These ligands are also capable of undergoing displacement under polymerization reaction conditions to produce a catalytically active species. The precursor compounds in Schemes 1 and 2 that bear halide or methyl ligands, in contrast, are not sufficiently stable toward hydroboration or hydroalumination reaction conditions. As such, pentafluorophenoxy ligands bonded to the transition metal center advantageously promote catalytic activity and compatibility with the syntheses described herein. It is to be appreciated that other ligands also capable of promoting catalytic activity and synthetic compatibility may also be suitably present in the metallocene compounds described herein, without departing from the scope of the present disclosure. Likewise, it is to be further appreciated that the particular $R^1$ and $R^2$ groups introduced into the metallocene compounds during hydroboration or hydroalumination may differ from the particular examples depicted. As such, the syntheses and particular metallocene compounds shown in Schemes 1 and 2 should be considered illustrative and non-limiting.

In various embodiments, the metallocene compounds described hereinabove may be catalytically active, either alone or when incorporated into a catalyst composition. According to more specific embodiments, catalyst compositions of the present disclosure may comprise at least one activator and a metallocene compound (described as above) or a reaction product of the metallocene compound with the at least one activator. Potential reaction products formed by reacting the metallocene compounds and the at least one activator are not considered to be particularly limited, and it is not necessarily required that the structure of the reaction products be known. Whether a reaction product forms, as well as the structure of the reaction product, may vary depending upon the chemical composition of the activator. In more specific embodiments, the catalyst compositions described herein may be catalytically active for promoting polymerization of an olefinic feed.

According to more specific embodiments, suitable activators for metallocene compounds of the present disclosure may comprise an alumoxane. Suitable alumoxanes are not considered to be especially limited, provided that they allow a polymerization reaction to occur upon contacting a polymerizable monomer, such as an olefinic feed, as described herein.

In more particular embodiments, methylalumoxane may be an especially suitable alumoxane for use in combination with the metallocene compounds disclosed herein. Particularly with the hafnium metallocene compounds described herein, alumoxane activation is somewhat surprising, since alumoxanes are often not particularly effective for activating these types of metallocene compounds.

Without being bound by any theory or mechanism, alumoxanes (such as MAO) are believed to activate the metallocene compounds of the present disclosure by first converting the pentafluorophenoxy ligands into at least one alkyl (methyl) ligand. An olefinic monomer may then be bonded to the transition metal center at an open first coordination site. Subsequent bonding of another molecule of the olefinic monomer at an open second coordination site may then allow olefin insertion to take place within the olefin bonded at the first coordination site. The polymer chain may then continue growing as subsequent olefin molecules become bonded and undergo insertion.

When the activator is an alumoxane, the maximum amount of activator typically is set at up to a 5000-fold molar excess Al/M over the catalyst compound (per metal catalytic site). The minimum activator-to-catalyst-compound is a 1:1 molar ratio. Alternate preferred ranges include from 1:1 to 500:1, alternately from 1:1 to 200:1, alternately from 1:1 to 100:1, or alternately from 1:1 to 50:1.

Other suitable activators for metallocene compounds that may be present in the metallocene compounds disclosed herein include compounds containing a non-coordinating anion, especially borane and borate compounds. Particularly useful borane and borate compounds containing a non-coordinating anion include, for example, $B(C_6F_5)_3$, $[PhNMe_2H]^+[B(C_6F_5)_4]^-$, and $[Ph_3C]^+[B(C_6F_5)_4]^-$.

A non-coordinating anion (NCA) is defined to mean an anion either that does not coordinate to the catalyst metal cation or that does coordinate to the metal cation, but only weakly. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. Typically, NCAs coordinate weakly enough that a neutral Lewis base, such as an olefinically or acetylenically unsaturated monomer can displace it from the catalyst center. Any metal or metalloid that can form a compatible, weakly coordinating complex may be used or contained in the non-coordinating anion. Suitable metals include, but are not limited to, aluminum, gold, and platinum. Suitable metalloids include, but are not limited to, boron, aluminum, phosphorus, and silicon. The term non-coordinating anion includes neutral activators, ionic activators, and Lewis acid activators.

"Compatible" non-coordinating anions are those which are not degraded to neutrality when the initially formed complex decomposes. Further, the anion does not transfer an anionic substituent or fragment to the cation so as to cause it to form a neutral transition metal compound and a neutral by-product from the anion. Non-coordinating anions useful in accordance with this invention are those that are compatible, stabilize the transition metal cation in the sense of balancing its ionic charge at +1, and yet retain sufficient lability to permit displacement during polymerization.

It is within the scope of this invention to use an ionizing, neutral, or ionic activator, such as tri(n-butyl)ammonium tetrakis(pentafluorophenyl)borate, a tris perfluorophenylboron metalloid precursor or a trisperfluoronaphthylboron metalloid precursor, polyhalogenated heteroborane anions (WO 1998/043983), boric acid (U.S. Pat. No. 5,942,459), or any combination thereof. It is also within the scope of this invention to use neutral or ionic activators alone or in combination with alumoxane activators.

The catalyst compositions or systems of this invention can include at least one non-coordinating anion (NCA) activator. In a preferred embodiment, boron-containing NCA activators represented by Formula 10 below can be used, $$Z_d^+(A^{d-}) \qquad \text{Formula 10}$$

where Z is (L-H) or a reducible Lewis acid; L is a neutral Lewis base; H is hydrogen; (L-H) is a Bronsted acid; $A^{d-}$ is a boron-containing non-coordinating anion having the charge d−; and d is 1, 2, or 3.

The cation component, $Z_d^+$ may include Bronsted acids such as protons or protonated Lewis bases or reducible Lewis acids capable of protonating or abstracting a moiety, such as an alkyl or aryl, from the bulky ligand metallocene containing transition metal catalyst precursor, resulting in a cationic transition metal species.

The activating cation $Z_d^+$ may also be a moiety such as silver, tropylium, carboniums, ferroceniums and mixtures thereof, preferably carboniums and ferroceniums. Preferred reducible Lewis acids can be any triaryl carbonium (where the aryl can be substituted or unsubstituted, such as those represented by the formula: $(Ar_3C^+)$, where Ar is aryl or aryl substituted with a heteroatom, a $C_1$ to $C_{40}$ hydrocarbyl, or a substituted $C_1$ to $C_{40}$ hydrocarbyl). Preferably, the reducible Lewis acids in Formula 10 above defined as "Z" include those represented by the formula: $(Ph_3C)$, where Ph is a substituted or unsubstituted phenyl, preferably substituted with $C_1$ to $C_{40}$ hydrocarbyls or substituted a $C_1$ to $C_{40}$ hydrocarbyls, preferably $C_1$ to $C_{20}$ alkyls or aromatics or substituted $C_1$ to $C_{20}$ alkyls or aromatics, and preferably $Z_d^+$ is triphenylcarbonium.

When $Z_d^+$ is the activating cation $(L-H)_d^+$, it is preferably a Bronsted acid, capable of donating a proton to the transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers such as dimethyl ether diethyl ether, tetrahydrofuran and dioxane, sulfoniums from thioethers, such as diethyl thioethers, tetrahydrothiophene, and mixtures thereof.

The anion component $A^{d-}$ includes those having the formula $[M^{k+}Q_n]^{d-}$ wherein k is 1, 2, or 3; n is 1, 2, 3, 4, 5, or 6 (preferably 1, 2, 3, or 4); n−k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halo-substituted hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ also include diboron compounds as disclosed in U.S. Pat. No. 5,447,895, which is fully incorporated herein by reference.

Illustrative but not limiting examples of boron compounds which may be used as an activator are the compounds described as (and particularly those specifically listed as) activators in U.S. Pat. No. 8,658,556, which is incorporated by reference herein.

Most preferably, the activator $Z_d^+ (A^{d-})$ is one or more of N,N-dimethylanilinium tetra(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, or triphenylcarbenium tetra(perfluorophenyl)borate.

Bulky activators are also useful herein as NCAs. "Bulky activator" as used herein refers to anionic activators represented by Formulas 11 or 12 below.

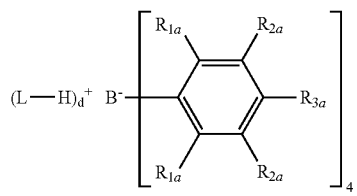

Formula 11

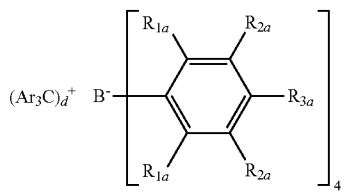

Formula 12

In Formulas 11 and 12, each $R_{1a}$ is, independently, a halide, preferably a fluoride; Ar is substituted or unsubstituted aryl group (preferably a substituted or unsubstituted phenyl), preferably substituted with $C_1$ to $C_{40}$ hydrocarbyls, preferably $C_1$ to $C_{20}$ alkyls or aromatics; each $R_{2a}$ is, independently, a halide, a $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_{2a}$ is a fluoride or a perfluorinated phenyl group); each $R_{3a}$ is a halide, $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_{3a}$ is a fluoride or a $C_6$ perfluorinated aromatic hydrocarbyl group); wherein $R_{2a}$ and $R_{3a}$ can form one or more saturated or unsaturated, substituted or unsubstituted rings (preferably $R_{2a}$ and $R_{3a}$ form a perfluorinated phenyl ring); and L is a neutral Lewis base; $(L-H)^+$ is a Bronsted acid; d is 1, 2, or 3; wherein the anion has a molecular weight of greater than 1020 g/mol; wherein at least three of the substituents on the B atom each have a molecular volume of greater than 250 cubic Å, alternately greater than 300 cubic Å, or alternately greater than 500 cubic Å, as specified below.

Preferably $(Ar_3C)_d^+$ is $(Ph_3C)_d^+$, where Ph is a substituted or unsubstituted phenyl, preferably substituted with $C_1$ to $C_{40}$ hydrocarbyls or substituted $C_1$ to $C_{40}$ hydrocarbyls, preferably $C_1$ to $C_{20}$ alkyls or aromatics or substituted $C_1$ to $C_{20}$ alkyls or aromatics.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume. Molecular volume may be calculated as reported in Girolami, G. S. (1994) "A Simple "Back of the Envelope" Method for Estimating the Densities and Molecular Volumes of Liquids and Solids," *Journal of Chemical Education*, v.71(11), pp. 962-964. Molecular volume (MV), in units of cubic A, is calculated using the formula: $MV=8.3V_S$, where $V_S$ is the scaled volume. $V_S$ is the sum of the relative volumes of the constituent atoms, and is calculated from the molecular formula of the substituent using the following listing of relative volumes. For fused rings, the $V_S$ is decreased by 7.5% per fused ring.

| Element | Relative Volume |
|---|---|
| H | 1 |
| 1st short period, Li to F | 2 |
| 2nd short period, Na to Cl | 4 |
| 1st long period, K to Br | 5 |

| Element | Relative Volume |
|---|---|
| $2^{nd}$ long period, Rb to I | 7.5 |
| $3^{rd}$ long period, Cs to Bi | 9 |

For a list of particularly useful bulky activators, U.S. Pat. No. 8,658,556, which is incorporated by reference herein, may be consulted.

In another embodiment, one or more of the NCA activators is chosen from the activators described in U.S. Pat. No. 6,211,105. The typical NCA activator-to-catalyst ratio, e.g., all NCA activators-to-catalyst ratio is about a 1:1 molar ratio. Alternate preferred ranges include from 0.1:1 to 100:1, alternately from 0.5:1 to 200:1, alternately from 1:1 to 500:1 alternately from 1:1 to 1000:1. A particularly useful range is from 0.5:1 to 10:1, preferably 1:1 to 5:1.

It is also within the scope of this invention that the catalyst compounds can be combined with combinations of alumoxanes and NCAs (see for example, U.S. Pat. Nos. 5,153,157 and 5,453,410; EP 0 573 120 B1, and PCT Application Publications WO 1994/007928 and WO 1995/014044, which discuss the use of an alumoxane in combination with an ionizing activator).

In some embodiments, the catalyst compositions of the present disclosure may be disposed on a solid support. The solid support may allow a catalytic reaction, such as polymerization of an olefinic feed, to be conducted under heterogeneous conditions. In more specific embodiments, the solid support may be silica. Other suitable solid supports may include, but are not limited to, alumina, magnesium chloride, talc, inorganic oxides or chlorides including one or more metals from Groups 2, 3, 4, 5, 13 or 14 of the Periodic Table, and polymers such as polystyrene, or functionalized and/or crosslinked polymers. Other inorganic oxides that may suitably function as solid supports include, for example, titania, zirconia, boron oxide, zinc oxide, magnesia, or any combination thereof. Combinations of inorganic oxides may be suitably used as solid supports as well. Illustrative combinations of suitable inorganic oxides include, but are not limited to, silica-alumina, silica-titania, silica-zirconia, silica-boron oxide, and the like.

In some embodiments, an alumoxane or other suitable activator may be disposed on silica or another suitable solid support before being combined with the metallocene compounds disclosed herein. In other embodiments, the metallocene compounds disclosed herein may be disposed upon silica or another suitable support before being combined with an alumoxane or other suitable activator. Upon combining the activator and the solid support with the metallocene compounds, the resulting catalyst composition may become disposed upon the solid support. Catalyst compositions having different catalytic properties may be obtained depending upon whether the metallocene compounds or the activator are supported on the solid support first.

In some embodiments, an alumoxane, such as MAO, may be mixed in an inert solvent such as toluene and then be slurried with a solid support, such as silica. Alumoxane deposition upon the solid support may occur at a temperature from about 60° C. to 120° C., or about 80° C. to 120° C., or about 100° C. to 120° C. Deposition occurring below 60° C., including room temperature deposition, may also be effective.

In some embodiments, suitable solid supports may have a surface area ranging from about 1 m$^2$/g to about 1000 m$^2$/g, or about 5 m$^2$/g to about 900 m$^2$/g, or about 50 m$^2$/g to about 500 m$^2$/g, or about 100 m$^2$/g to about 400 m$^2$/g. In some or other embodiments, the solid support may have a pore volume ranging from about 0.01 cm$^3$/g to about 4 cm$^3$/g, or about 0.1 cm$^3$/g to about 3 cm$^3$/g, or about 0.8 cm$^3$/g to about 3 cm$^3$/g, or about 1 cm$^3$/g to about 2.5 cm$^3$/g. In some or other embodiments, the solid support may have an average particle size ranging from about 0.1 μm low of about 500 μam, or about 0.3 μm to about 400 μm, or about 0.5 μm to about 250 μm, or about 1 μm to about 200 μm, or about 5 μm to about 150 μm, or about 10 μm to about 100 μm.

The amount of activator combined with the metallocene compound in the catalyst compositions of the present disclosure can widely vary. In various embodiments, the molar amount of the metallocene compound to the activator can range from about 1:1 to about 100,000:1. For example, the ratio of activator to metallocene can range from about 2:1, about 5:1, about 10:1, about 25:1, about 50:1, or about 100:1, up to about 500:1, about 1000:1, about 5000:1, or about 10,000:1.

Accordingly, in some or other embodiments of the present disclosure, polymerization methods are also described herein. In more specific embodiments, the polymerization methods of the present disclosure may comprise providing an olefinic feed, and contacting a catalyst composition, as defined herein, with the olefinic feed under polymerization reaction conditions.

Suitable polymerization reaction conditions may include, for example, any high-pressure, solution, slurry and/or gas phase polymerization process. According to more specific embodiments, the catalyst compositions may be located in a fixed bed, fluidized bed, ebullated bed, slurry bed, trickle bed, or like reactor system when conducting a polymerization reaction.

Polymerization processes of this invention can be carried out in any manner known in the art. Any suspension, homogeneous, bulk, solution, slurry, or gas phase polymerization process known in the art can be used. Such processes can be run in a batch, semi-batch, or continuous mode. (The term "continuous" means a system that operates without interruption or cessation. For example a continuous process to produce a polymer would be one where the reactants are continually introduced into one or more reactors and polymer product is continually withdrawn.) Homogeneous polymerization processes and slurry processes are useful. (A homogeneous polymerization process is defined to be a process where at least 90 wt. % of the product is soluble in the reaction media.) A bulk homogeneous process is particularly preferred. (A bulk process is defined to be a process where monomer concentration in all feeds to the reactor is 70 vol. % or more.) Alternately, no solvent or diluent is present or added in the reaction medium, (except for the small amounts used as the carrier for the catalyst system or other additives, or amounts typically found with the monomer; e.g., propane in propylene). In another embodiment, the process is a slurry process. As used herein the term "slurry polymerization process" means a polymerization process where a supported catalyst is employed and monomers are polymerized on the supported catalyst particles. At least 95 wt. % of polymer products derived from the supported catalyst are in granular form as solid particles (not dissolved in the diluent).

Useful polymerization processes include heterogeneous polymerization processes, such as gas phase and slurry phase processes. A heterogeneous process is defined to be a process where the catalyst system is not soluble in the reaction media. Alternatively, in other embodiments, the polymerization process is not homogeneous.

Preferably, the polymerization is performed in the gas phase, preferably, in a fluidized bed gas phase process. Generally, in a fluidized bed gas phase process used for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See, for example, U.S. Pat. Nos. 4,543,399; 4,588,790; 5,028,670; 5,317,036; 5,352,749; 5,405,922; 5,436,304; 5,453,471; 5,462,999; 5,616,661; and 5,668,228; all of which are fully incorporated herein by reference.) Other additives may also be used in the polymerization, as desired, such as one or more scavengers, promoters, modifiers, chain transfer agents (such as diethyl zinc), reducing agents, oxidizing agents, hydrogen, aluminum alkyls, or silanes. Useful chain transfer agents are typically alkylalumoxanes, a compound represented by the formula $AlR_3$, $ZnR_2$ (where each R is, independently, a $C_1$-$C_8$ aliphatic radical, preferably methyl, ethyl, propyl, butyl, pentyl, hexyl octyl or an isomer thereof) or a combination thereof, such as diethyl zinc, methylalumoxane, trimethylaluminum, triisobutylaluminum, trioctylaluminum, or a combination thereof.

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_{4-10}$ alkanes, chlorobenzene, and aromatic and alkyl-substituted aromatic compounds, such as benzene, toluene, mesitylene, and xylene. Suitable solvents also include liquid olefins which may act as monomers or co-monomers including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt. %, preferably less than 0.5 wt. %, preferably less than 0 wt. % based upon the weight of the solvents. Typical temperatures and/or pressures include a temperature in the range of from about 0° C. to about 300° C., preferably about 20° C. to about 200° C., preferably about 35° C. to about 150° C., preferably from about 40° C. to about 120° C., preferably from about 45° C. to about 80° C.; and at a pressure in the range of from about 0.35 MPa to about 10 MPa, preferably from about 0.45 MPa to about 6 MPa, or preferably from about 0.5 MPa to about 4 MPa.

In a typical polymerization, the run time of the reaction is up to 300 minutes, preferably in the range of from about 5 to 250 minutes, or preferably from about 10 to 120 minutes.

In some embodiments hydrogen is present in the polymerization reactor at a partial pressure of 0.001 to 50 psig (0.007 to 345 kPa), preferably from 0.01 to 25 psig (0.07 to 172 kPa), more preferably 0.1 to 10 psig (0.7 to 70 kPa).

In some embodiments, hydrogen gas may be included in the polymerization reaction conditions. The hydrogen gas may influence the properties of the resulting polyolefin polymer, such as altering the melt flow index or molecular weight, compared to an analogous polymerization reaction conducted without the hydrogen gas. The amount of hydrogen gas that is present may also alter these properties as well. According to various embodiments, the molar ratio of hydrogen gas to olefinic feed may range from about 0.0001:1 to about 10000:1. In more specific embodiments, the amount of hydrogen gas may range up to about 5,000 ppm, or up to about 4,000 ppm, or up to about 3,000 ppm, or up to about 2,000 ppm, or up to about 1,000 ppm, or up to about 500 ppm, or up to about 400 ppm, or up to about 300 ppm, or up to about 200 ppm, or up to about 100 ppm, or up to about 50 ppm, or up to about 10 ppm, or up to about 1 ppm.

Any olefinic feed can be polymerized using the catalyst compositions disclosed herein. Suitable olefinic feeds may include any $C_2$-$C_{40}$ alkene, which may be straight chain or branched, cyclic or acyclic, and terminal or non-terminal, optionally containing heteroatom substitution. In more specific embodiments, the olefinic feed may comprise a $C_2$-$C_{12}$ alkene such, for example, ethene, propene, 1-butene, 2-butene, 1-pentene, cyclopentene, 1-hexene, cyclohexene, 1-octene, 1-decene, or 1-dodecene. Other suitable monomers may include ethylenically unsaturated monomers, diolefins having 4 to 18 carbon atoms, conjugated or non-conjugated dienes, polyenes, vinyl monomers and cyclic olefins. Non-limiting olefinic monomers may also include norbornene, norbornadiene, isobutylene, isoprene, vinylbenzocyclobutane, styrenes, alkyl substituted styrene, ethylidene norbornene, dicyclopentadiene and cyclopentene. The olefinic feed may comprise any single alkene or any mixture of one or more of the foregoing alkenes.

Preferred olefinic feeds include $C_2$ to $C_{20}$ alpha-olefins, such as ethylene, propylene, butene, pentene, hexene, heptene, octene, nonene, decene, undecene, docecene or mixtures thereof.

In some embodiments, a copolymer of an olefinic monomer and one or more co-monomers may be produced. In some embodiments, the monomer is propylene and the one or more co-monomers may comprise ethylene or an α-olefin having from 4 to 15 carbon atoms, or from 4 to 12 carbon atoms, or from 4 to 8 carbon atoms. In more specific embodiments, 1-hexene may be a suitable co-monomer.

In some embodiments, the monomer is ethylene and the one or more co-monomers may comprise an α-olefin having from 3 to 15 carbon atoms, or from 4 to 12 carbon atoms, or from 4 to 8 carbon atoms. In more specific embodiments, 1-hexene may be a suitable co-monomer.

In an embodiment, the process described herein produces polyolefins including homopolymers and copolymers of one, two, three, four or more $C_2$ to $C_{40}$ olefin monomers, for example, $C_2$ to $C_{20}$ α-olefin monomers.

For example, the polyolefins may be copolymers of a $C_2$ to $C_{40}$ olefin and one, two or three or more different $C_2$ to $C_{40}$ olefins, (where the $C_2$ to $C_{40}$ olefins are preferably $C_3$ to $C_{20}$ olefins, preferably are $C_3$ to $C_{12}$ α-olefin, preferably are propylene, butene, hexene, octene, decene, dodecene, preferably propylene, butene, hexene, octene, or a mixture thereof).

The copolymer may comprise from 99.0 to about 80.0 wt. %, 99.0 to 85.0 wt. %, 99.0 to 87.5 wt. %, 99.0 to 90.0 wt. %, 99.0 to 92.5 wt. %, 99.0 to 95.0 wt. %, or 99.0 to 97.0 wt. %, of polymer units derived from the monomer (such as ethylene or propylene) and about 1.0 to about 20.0 wt. %, 1.0 to 15.0 wt. %, 0.5 to 12.5 wt. %, 1.0 to 10.0 wt. %, 1.0 to 7.5 wt. %, 1.0 to 5.0 wt. %, or 1.0 to 3.0 wt. % of polymer units derived from one or more $C_3$ to $C_{20}$ α-olefin co-monomers that are different from the monomer, preferably $C_3$ to $C_{10}$ α-olefins, and more preferably $C_4$ to $C_8$ α-olefins, such as hexene and octene. The α-olefin co-monomer may be linear or branched, and two or more co-monomers may be used, if desired.

Examples of suitable co-monomers include propylene, butene, 1-pentene; 1-pentene with one or more methyl, ethyl, or propyl substituents; 1-hexene; 1-hexene with one or more methyl, ethyl, or propyl substituents; 1-heptene; 1-heptene with one or more methyl, ethyl, or propyl substituents; 1-octene; 1-octene with one or more methyl, ethyl, or propyl substituents; 1-nonene; 1-nonene with one or more methyl, ethyl, or propyl substituents; ethyl, methyl, or dimethyl-substituted 1-decene; 1-dodecene; and styrene. Particularly suitable co-monomers include 1-butene, 1-hexene, and 1-octene, 1-hexene, and mixtures thereof.

The polymerization methods of the present disclosure, the polymerization reaction conditions may include a reaction temperature from about 30° C. to about 150° C., or from about 50° C. to about 150° C., or from about 80° C. to about 140° C., or from about 90° C. to about 130° C. Alternately the polymerization reaction conditions may include temperatures ranging from about 30° C., or about 50° C., or about 100° C. up to the melting point of the polymer produced. In the specific case of ethylene polymerization, the polymerization reaction may take place at a temperature from about 80° C. to about 110° C. and a pressure of at least about 20 bar (2 MPa), or at least about 40 bar (4 MPa), or at least about 100 bar (100 MPa), or at least about 150 bar (15 MPa). A suitable maximum temperature may be dependent upon the melting point (Tm) of the polymer produced, i.e. that the polymerization temperature is at the Tm or is under the Tm, or is over the Tm, preferably by at least 1° C., preferably by at least 3° C., preferably by at least 5° C., preferably by at least 10° C.

Polymers produced using the metallocene compounds and polymerization reactions of the present disclosure may be characterized by a range of physical property measurements, as discussed hereinafter.

In some embodiments, polyolefins produced using the catalyst compositions of the present disclosure may have a density ranging from about 0.86 g/cc to about 0.97 g/cc, or about 0.90 g/cc to about 0.950 g/cc, or about 0.905 g/cc to about 0.940 g/cc, or about 0.910 g/cc to about 0.930 g/cc, as determined by ASTM D 1505.

In some embodiments, polyolefins produced using the catalyst compositions of the present disclosure may have a ratio of weight average molecular weight to number average molecular weight (Mw/Mn) of greater than 2.0 to about 10, or greater than 2.2 to about 8, or greater than 2.4 to about 7, or greater than 2.5 to about 6, as determined by the 4D-GPC described below.

In some embodiments, polyolefins produced using the catalyst compositions of the present disclosure may have a ratio of z-average molecular weight to weight average molecular weight (Mz/Mw) of greater than 2.2, or greater than 2.5, or greater than 2.8, or from about 2.2 to about 4.0, or from about 2.4 to about 3.8, or from about 2.6 to about 3.6, as determined by the 4D-GPC described below.

In some embodiments, polyolefins produced using the catalyst compositions of the present disclosure may have a ratio of z-average molecular weight to number average molecular weight (Mz/Mn) of 10 or greater, or from about 10 to about 50, or from about 12 to about 45, or from about 15 to about 40, as determined by the 4D-GPC described below.

In some embodiments, polyolefins produced using the catalyst compositions of the present disclosure may have a weight average molecular weight (Mw) of 50,000 g/mol or more, as determined by the 4D-GPC described below.

In some embodiments, polyolefins produced using the catalyst compositions of the present disclosure may have a number average molecular weight (Mn) of 10,000 g/mol or more as determined by the 4D-GPC described below.

In some embodiments, polyolefins produced using the catalyst compositions of the present disclosure may have a z average molecular weight (Mz) of 100,000 g/mol or more as determined by the 4D-GPC described below.

In some embodiments, polyolefins produced using the catalyst compositions of the present disclosure may have a g'(vis) of 0.900 or greater, alternatively, 0.930 or greater, alternatively, 0.940 or greater, and alternatively 0.980 or greater, as determined by the 4D-GPC described below.

In some embodiments, polyolefins produced using the catalyst compositions of the present disclosure may have a melting point (Tm) of from 100 to 200° C. as determined by Differential Scanning calorimetry.

In some embodiments, polyolefins produced using the catalyst compositions of the present disclosure may have a melt index (MI), as measured by ASTM-D-1238-E (190° C./2.16 kg), from 0.1 dg/min to 100 dg/min, or from 0.2 dg/min to 20 dg/min, or from 0.3 dg/min to 5 dg/min, or from 0.5 dg/min to 1.5 dg/min.

In some embodiments, the polyolefins may have a melt index ratio (MIR, HLMI/MI), as measured by ASTM-D-1238-F, of 15 to 50, or, from about 20 to 50, or from about 22 to 50, or from about 25 to 50, or from about 30 to 45.

In some embodiments, polyolefins produced using the catalyst compositions of the present disclosure may have a high load melt index (HLMI) (121.6) in accordance with ASTM 1238 (190° C./21.6 kg) of from 1 to 60 g/10 min, 5 to 40 g/10 min, 5 to 50 g/10 min, 15 to 50 g/10 min, or 20 to 50 g/10 min.

In some embodiments, polyolefins produced using the catalyst compositions of the present disclosure may have a bulk density of 0.25 g/cc or greater, alternatively, 0.30 g/cc or greater, alternatively, 0.40 g/cc or greater, as determined by the procedure described below.

In some embodiments, polyolefins produced using the catalyst compositions of the present disclosure comprise at least 65 wt. % of monomer (such as ethylene) derived units and from 0 to 35 wt. % of $C_3$-$C_{12}$ olefin co-monomer (such as propylene, butene, hexene, octene, etc.) derived units, based upon the total weight of the polyolefin composition; wherein the polyolefin composition has:
 a) a Tm of 100° C. or more;
 b) an HLMI of from 1 to 60 dg/min;
 c) a bulk density of 0.25 g/cc or more;
 d) a density of from 0.860 g/cm³ to 0.970 g/cm³;
 e) an MI of from 0.1 to 100 dg/min;
 f) an MIR of from 15 to 50;
 g) an Mw/Mn of from 2 to 10;
 h) an Mz/Mw of from 2.5 to;
 i) an Mz/Mn of 2.2 or more;
 j) a $g'_{(vis)}$ of 0.900 or greater;
 k) an Mw of 50,000 g/mol or more;
 l) an Mn of 10,000 g/mol or more; and
 m) an Mz of 100,000 g/mol or more.

Processing of the polymers may take place following the polymerization reaction. Suitable processing operations may include, for example, blending or co-extrusion with any other polymer. Non-limiting examples of other polymers include linear low density polyethylenes, elastomers, plastomers, high pressure low density polyethylene, high density polyethylenes, polypropylenes and the like. The polymers formed according to the present disclosure may also be blended with additives to form compositions that can then be used in articles of manufacture. Suitable additives may include antioxidants, nucleating agents, acid scavengers, plasticizers, stabilizers, anticorrosion agents, blowing agents, ultraviolet light absorbers, quenchers, antistatic agents, slip agents, phosphites, phenolics, pigments, dyes and fillers and cure agents such as peroxide.

This invention further relates to:

A. Compositions comprising a metallocene represented by the formula:

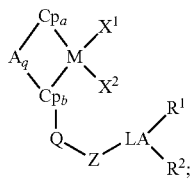

wherein:
  $Cp_a$ and $Cp_b$ are optionally-substituted cyclopentadienyl rings;
  A is an optional bridging group linking $Cp_a$ to $Cp_b$; q is 0 or 1; Q is O, $O(CR^3R^4)_m$, $(CR^3R^4)_mO$, or $(CR^3R^4)_m$, and m is an integer ranging from 0 to about 18;
  Z is $(CR^3R^4)_2$;
  LA is a Lewis acid;
  M is a transition metal haptically bonded to $Cp_a$ and $Cp_b$; and $X^1$ and $X^2$ are independently $R^5$ or $OR^5$;
  wherein $R^1$ and $R^2$ are independently selected from an optionally-substituted hydrocarbyl group having 1 to about 20 carbon atoms, the optionally-substituted hydrocarbyl group being linear or branched, saturated or unsaturated, aliphatic or aromatic, and cyclic or acyclic;
  wherein $R^3$ and $R^4$ are independently selected from the group consisting of H, halogen, and an optionally-substituted hydrocarbyl group having 1 to about 20 carbon atoms, the optionally-substituted hydrocarbyl group being linear or branched, saturated or unsaturated, aliphatic or aromatic, and cyclic or acyclic; and
  wherein $R^5$ is alkyl, aryl, perfluoroalkyl, or perfluoroaryl.

B. Catalyst compositions comprising an activated metallocene comprising at least one activator and a metallocene compound represented by the formula:

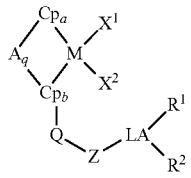

or a reaction product of the metallocene compound with the at least one activator;
wherein:
  $Cp_a$ and $Cp_b$ are optionally-substituted cyclopentadienyl rings;
  A is an optional bridging group linking $Cp_a$ to $Cp_b$; q is 0 or 1; Q is O, $O(CR^3R^4)_m$, $(CR^3R^4)_mO$, or $(CR^3R^4)_m$, and m is an integer ranging from 0 to about 18;
  Z is $(CR^3R^4)_2$;
  LA is a Lewis acid;
  M is a transition metal haptically bonded to $Cp_a$ and $Cp_b$; and $X^1$ and $X^2$ are independently $R^5$ or $OR^5$;
  wherein $R^1$ and $R^2$ are independently selected from an optionally-substituted hydrocarbyl group having 1 to about 20 carbon atoms, the optionally-substituted hydrocarbyl group being linear or branched, saturated or unsaturated, aliphatic or aromatic, and cyclic or acyclic;
  wherein $R^3$ and $R^4$ are independently selected from the group consisting of H, halogen, and an optionally-substituted hydrocarbyl group having 1 to about 20 carbon atoms, the optionally-substituted hydrocarbyl group being linear or branched, saturated or unsaturated, aliphatic or aromatic, and cyclic or acyclic; and
  wherein $R^5$ is alkyl, aryl, perfluoroalkyl, or perfluoroaryl.

C. Methods for polymerizing an olefinic feed comprising providing an olefinic feed; and contacting a catalyst composition with the olefinic feed under polymerization reaction conditions, where catalyst compositions comprises at least one activator and a metallocene compound represented by the formula:

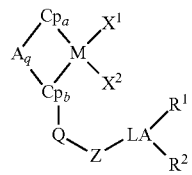

or a reaction product of the metallocene compound with the at least one activator;
wherein:
  $Cp_a$ and $Cp_b$ are optionally-substituted cyclopentadienyl rings;
  A is an optional bridging group linking $Cp_a$ to $Cp_b$;
  q is 0 or 1 indicating the presence or absence of A;
  Q is O, $O(CR^3R^4)_m$, $(CR^3R^4)_mO$, or $(CR^3R^4)_m$, and m is an integer ranging from 0 to about 18;
  Z is $(CR^3R^4)_2$;
  LA is a Lewis acid;
  M is a transition metal haptically bonded to $Cp_a$ and $Cp_b$; and
  $X^1$ and $X^2$ are independently $R^5$ or $OR^5$;
  wherein $R^1$ and $R^2$ are independently selected from an optionally-substituted hydrocarbyl group having 1 to about 20 carbon atoms, the optionally-substituted hydrocarbyl group being linear or branched, saturated or unsaturated, aliphatic or aromatic, and cyclic or acyclic;
  wherein $R^3$ and $R^4$ are independently selected from the group consisting of H, halogen, and an optionally-substituted hydrocarbyl group having 1 to about 20 carbon atoms, the optionally-substituted hydrocarbyl group being linear or branched, saturated or unsaturated, aliphatic or aromatic, and cyclic or acyclic; and
  wherein $R^5$ is alkyl, aryl, perfluoroalkyl, or perfluoroaryl.

Embodiments A-C may have one or more of the following additional elements in any combination:

Element 1: wherein A is present (q=1) and is an alkylene or a silylene group;

Element 2: wherein A is $SiR^6R^7$; wherein $R^6$ and $R^7$ are independently an optionally-substituted hydrocarbyl group having 1 to about 20 carbon atoms, the optionally-substituted hydrocarbyl group being linear or branched, saturated or unsaturated, aliphatic or aromatic, and cyclic or acyclic;

Element 3: wherein LA is Al or B;
Element 4: wherein $X^1$ and $X^2$ are pentafluorophenoxy;
Element 5: wherein Q is $(CH_2)_m$, and m ranges from 0 to about 12;
Element 6: wherein m ranges from 0 to 4, e.g. 0, 1, 2, 3, or 4;
Element 7: wherein Z is $(CH_2)_2$;
Element 8: wherein M is Zr or Hf;
Element 9: wherein M is Hf;
Element 10: wherein the at least one activator comprises an alumoxane;
Element 11: wherein the alumoxane is methylalumoxane;
Element 12: wherein the catalyst composition is disposed on a solid support; or
Element 13: wherein the polymerization reaction conditions include hydrogen gas.

By way of non-limiting example, exemplary combinations include: The composition of A in combination with elements 1 and 2; 1 and 3; 1 and 4; 1, 3 and 4; 1 and 5; 1, 3, and 5; 1, 2, 5, and 6; 1, 3, 5, and 6; 1 and 7; 1, 2, 3, and 5-7; 1-7; 1, 3, 4, and 5-7; 1, 3, and 5-7; 1 and 8 or 9; 1, 2, and 8 or 9; 1-3 and 8 or 9; 1-4 and 8 or 9; 1, 3, and 8 or 9; 1, 4, and 8 or 9; 1 and 4-8; 1, 4-7, and 9; 1 and 5-8; 1, 5-7, and 9; 1-8; 1-7 and 9; 3 and 4; 3 and 5; 3, 5, and 6; 3 and 5-7; 3 and 4-7; 3 and 8 or 9; 3, 4, and 8 or 9; 3, 5 and 8 or 9; 3-5 and 8 or 9; 3-8; 3-7 and 9; 4 and 5; 4-6; 4-7; 4 and 7; 4 and 8; 4 and 9; 4-8; 4-7 and 9; 5 and 7; 5-7; 5 and 8; 5-8; 5-7 and 9; 5 and 7; 5, 7, and 8; or 5, 7, and 9. The catalyst composition of B in combination with elements 1 and 2; 1 and 3; 1 and 4; 1, 3, and 4; 1 and 5; 1, 3, and 5; 1, 2, 5, and 6; 1, 3, 5, and 6; 1 and 7; 1, 2, 3, and 5-7; 1-7; 1, 3, 4, and 5-7; 1, 3, and 5-7; 1 and 8 or 9; 1, 2, and 8 or 9; 1-3 and 8 or 9; 1-4 and 8 or 9; 1, 3, and 8 or 9; 1, 4, and 8 or 9; 1 and 4-8; 1, 4-7 and 9; 1 and 5-8; 1, 5-7, and 9; 1-8; 1-7 and 9; 3 and 4; 3 and 5; 3, 5, and 6; 3 and 5-7; 3 and 4-7; 3 and 8 or 9; 3, 4, and 8 or 9; 3, 5, and 8 or 9; 3-5 and 8 or 9; 3-8; 3-7 and 9; 4 and 5; 4-6; 4-7; 4 and 7; 4 and 8; 4 and 9; 4-8; 4-7 and 9; 5 and 7; 5-7; 5 and 8; 5-8; 5-7 and 9; 5 and 7; 5, 7, and 8; or 5, 7 and 9, any of which may be in further combination with elements 10; 11; 12; 10 and 11; 10 and 12; or 10-12. The catalyst composition of B in combination with elements 10 and 11; 10 and 12; or 10-12. The catalyst method of C in combination with elements 1 and 2; 1 and 3; 1 and 4; 1, 3, and 4; 1 and 5; 1, 3, and 5; 1, 2, 5, and 6; 1, 3, 5, and 6; 1 and 7; 1, 2, 3, and 5-7; 1-7; 1, 3, 4, and 5-7; 1, 3, and 5-7; 1 and 8 or 9; 1, 2, and 8 or 9; 1-3 and 8 or 9; 1-4 and 8 or 9; 1, 3, and 8 or 9; 1, 4, and 8 or 9; 1 and 4-8; 1, 4-7, and 9; 1 and 5-8; 1, 5-7 and 9; 1-8; 1-7 and 9; 3 and 4; 3 and 5; 3, 5, and 6; 3 and 5-7; 3 and 4-7; 3 and 8 or 9; 3, 4, and 8 or 9; 3, 5, and 8 or 9; 3-5 and 8 or 9; 3-8; 3-7 and 9; 4 and 5; 4-6; 4-7; 4 and 7; 4 and 8; 4 and 9; 4-8; 4-7 and 9; 5 and 7; 5-7; 5 and 8; 5-8; 5-7 and 9; 5 and 7; 5, 7 and 8; or 5, 7, and 9, any of which may be in further combination with elements 10; 11; 12; 10 and 11; 10 and 12; 10-12; 10 and 13; 12 and 13; or 13.

This invention further relates to:
1. A metallocene compound represented by the formula:

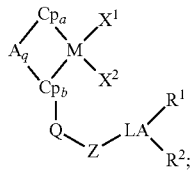

wherein:
$Cp_a$ and $Cp_b$ are optionally-substituted cyclopentadienyl rings;
q is 0 or 1;
A is an optional bridging group linking $Cp_a$ to $Cp_b$;
Q is O, $O(CR^3R^4)_m$, $(CR^3R^4)_mO$, or $(CR^3R^4)_m$, and m is an integer ranging from 0 to about 18;
Z is $(CR^3R^4)_2$;
LA is a Lewis acid;
M is a transition metal haptically bonded to $Cp_a$ and $Cp_b$;
$X^1$ and $X^2$ are independently $R^5$ or $OR^5$;
wherein $R^1$ and $R^2$ are independently selected from an optionally-substituted hydrocarbyl group having 1 to about 20 carbon atoms, the optionally-substituted hydrocarbyl group being linear or branched, saturated or unsaturated, aliphatic or aromatic, and cyclic or acyclic;
wherein $R^3$ and $R^4$ are independently selected from the group consisting of H, halogen, and an optionally-substituted hydrocarbyl group having 1 to about 20 carbon atoms, the optionally-substituted hydrocarbyl group being linear or branched, saturated or unsaturated, aliphatic or aromatic, and cyclic or acyclic; and
wherein $R^5$ is alkyl, aryl, perfluoroalkyl, or perfluoroaryl.
2. The metallocene compound of paragraph 1, wherein q is 1 and A is an alkylene or silylene group.
3. The metallocene compound of paragraph 2, wherein q is 1 and A is $SiR^6R^7$; wherein $R^6$ and $R^7$ are independently an optionally-substituted hydrocarbyl group having 1 to about 20 carbon atoms, the optionally-substituted hydrocarbyl group being linear or branched, saturated or unsaturated, aliphatic or aromatic, and cyclic or acyclic.
4. The metallocene compound of any one of paragraphs 1-3, wherein LA is Al or B.
5. The metallocene compound of any one of paragraphs 1-4, wherein $X^1$ and $X^2$ are pentafluorophenoxy.
6. The metallocene compound of any one of paragraphs 1-5, wherein Q is $(CH_2)_m$, and m ranges from 0 to about 12, e.g., m is 0, 1, 2, 3, 4, 5, 6, 7, 8, 9, 10, 11 or 12.
7. The metallocene compound of any one of paragraphs 1-6, wherein m ranges from 0 to 4, e.g., m is 0, 1, 2, 3, or 4.
8. The metallocene compound of any one of paragraphs 1-7, wherein Z is $(CH_2)_2$.
9. The metallocene compound of any one of paragraphs 1-8, wherein M is Zr or Hf.
10. The metallocene compound of any one of paragraphs 1-8, wherein M is Hf.
11. A catalyst composition comprising: at least one activator; and a metallocene compound of any of claims 1 to 10 or a reaction product of the metallocene compound with the at least one activator.
12. The catalyst composition of paragraph 11, wherein the at least one activator comprises an alumoxane.
13. The catalyst composition of paragraph 12, wherein the alumoxane is methylalumoxane.
14. The catalyst composition of any one of paragraphs 11-13, wherein the catalyst composition is disposed on a solid support.
15. The catalyst composition of any one of paragraphs 11-14, wherein A is present and is an alkylene or a silylene group.
16. The catalyst composition of paragraph 15, wherein A is $SiR^6R^7$; wherein $R^6$ and $R^7$ independently selected from an optionally-substituted hydrocarbyl group having 1 to about 20 carbon atoms, the optionally-substituted hydrocarbyl group being linear or branched, saturated or unsaturated, aliphatic or aromatic, and cyclic or acyclic.

17. The catalyst composition of any one of paragraphs 11-16, wherein LA is Al or B.
18. The catalyst composition of any one of paragraphs 11-17, wherein $X^1$ and $X^2$ are pentafluorophenoxy.
19. The catalyst composition of any one of paragraphs 11-18, wherein Q is $(CH_2)_m$, and m ranges from 0 to about 12, e.g. m is 0, 1, 2, 3, 4, 5, 6, 7, 8, 9, 10, 11 or 12.
20. The catalyst composition of any one of paragraphs 11-19, wherein m ranges from 0 to 4, e.g., m is 0, 1, 2, 3, or 4.
21. The catalyst composition of any one of paragraphs 11-20, wherein Z is $(CH_2)_2$.
22. The catalyst composition of any one of paragraphs 11-21, wherein M is Zr or Hf.
23. The catalyst composition of any one of paragraphs 11-21, wherein M is Hf.
24. A method comprising: providing an olefinic feed; and contacting the catalyst composition of any of paragraphs 11 to 23 with the olefinic feed under polymerization reaction conditions.
25. The method of paragraph 24, wherein the polymerization reaction conditions include hydrogen gas.
26. The method of paragraph 24 or paragraph 25, wherein the catalyst composition is disposed upon a solid support.
27. The method of any of paragraphs 24 to 26 wherein the polymerization takes place in the gas phase.

This invention also relates to:

1A. A metallocene compound represented by the formula:

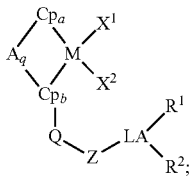

wherein:
$Cp_a$ and $Cp_b$ are optionally-substituted cyclopentadienyl rings;
A is an optional bridging group linking $Cp_a$ to $Cp_b$;
q is zero or 1;
Q is O, $O(CR^3R^4)_m$, $(CR^3R^4)_mO$, or $(CR^3R^4)_m$, and m is an integer ranging from 0 to about 18;
Z is $(CR^3R^4)_2$;
LA is a Lewis acid;
M is a transition metal haptically bonded to $Cp_a$ and $Cp_b$;
$X^1$ and $X^2$ are independently $R^5$ or $OR^5$;
wherein $R^1$ and $R^2$ are independently selected from an optionally-substituted hydrocarbyl group having 1 to about 20 carbon atoms, the optionally-substituted hydrocarbyl group being linear or branched, saturated or unsaturated, aliphatic or aromatic, and cyclic or acyclic;
wherein $R^3$ and $R^4$ are independently selected from the group consisting of H, halogen, and an optionally-substituted hydrocarbyl group having 1 to about 20 carbon atoms, the optionally-substituted hydrocarbyl group being linear or branched, saturated or unsaturated, aliphatic or aromatic, and cyclic or acyclic; and
wherein $R^5$ is alkyl, aryl, perfluoroalkyl, or perfluoroaryl.
2A. The metallocene compound of paragraph 1A, wherein M is Zr or Hf, and LA is Al or B.
3A. The metallocene compound of paragraph 1A, wherein q is 1 and A is an alkylene or a silylene group.
4A. The metallocene compound of paragraph 1A, wherein $X^1$ and $X^2$ are pentafluorophenoxy.
5A. The metallocene compound of paragraph 1A, wherein A is $SiR^6R^7$; wherein $R^6$ and $R^7$ are independently an optionally-substituted hydrocarbyl group having 1 to about 20 carbon atoms, the optionally-substituted hydrocarbyl group being linear or branched, saturated or unsaturated, aliphatic or aromatic, and cyclic or acyclic.
6A. The metallocene compound of paragraph 5A, wherein $X^1$ and $X^2$ are pentafluorophenoxy.
7A. The metallocene compound of paragraph 5A, wherein Q is $(CH_2)_m$ and Z is $(CH_2)_2$, and m ranges from 0 to about 12.
8A. The metallocene compound of paragraph 7A, wherein m ranges from 0 to 4.
9A. The metallocene compound of paragraph 8A, wherein M is Hf.
10A. The metallocene compound of paragraph 1A, wherein Q is $(CH_2)_m$ and Z is $(CH_2)_2$, and m ranges from 0 to about 12.
11A. The metallocene compound of paragraph 10A, wherein m ranges from 0 to 4.
12A. The metallocene compound of paragraph 10A, wherein $X^1$ and $X^2$ are pentafluorophenoxy.
13A. The metallocene compound of paragraph 10A, wherein M is Hf.
14A. A catalyst composition comprising at least one activator; and the metallocene compound of any of paragraphs 1A to 13A or a reaction product of the metallocene compound with the at least one activator.
15A. The catalyst composition of paragraph 14A, wherein the at least one activator comprises an alumoxane.
16A. The catalyst composition of paragraph 14A, wherein the alumoxane is methylalumoxane.
17A. The catalyst composition paragraph 14A, wherein the catalyst composition is disposed on a solid support.
18A. The catalyst composition paragraph 15A, wherein the catalyst composition is disposed on a solid support.
19A. A method comprising providing an olefinic feed; and contacting the catalyst composition of paragraph 14A with the olefinic feed under polymerization reaction conditions.
20A. The method of paragraph 19A, wherein the polymerization reaction conditions include hydrogen gas.

This invention also relates to:

1B. A metallocene compound represented by the formula:

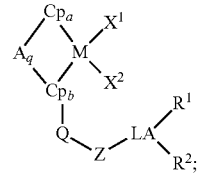

wherein:
$Cp_a$ and $Cp_b$ are optionally-substituted cyclopentadienyl rings;
q is zero or 1;
A is an optional bridging group linking $Cp_a$ to $Cp_b$;
Q is O, $O(CR^3R^4)_m$, $(CR^3R^4)_mO$, or $(CR^3R^4)_m$, and m is an integer ranging from 0 to about 18, preferably 0 to 4;
Z is $(CR^3R^4)_2$;
LA is a Lewis acid, preferably Al or B;
M is a transition metal haptically bonded to $Cp_a$ and $Cp_b$, preferably Hf or Zr;
$X^1$ and $X^2$ are independently $R^5$ or $OR^5$;

wherein $R^1$ and $R^2$ are independently selected from an optionally-substituted hydrocarbyl group having 1 to about 20 carbon atoms, the optionally-substituted hydrocarbyl group being linear or branched, saturated or unsaturated, aliphatic or aromatic, and cyclic or acyclic;

wherein $R^3$ and $R^4$ are independently selected from the group consisting of H, halogen, and an optionally-substituted hydrocarbyl group having 1 to about 20 carbon atoms, the optionally-substituted hydrocarbyl group being linear or branched, saturated or unsaturated, aliphatic or aromatic, and cyclic or acyclic; and wherein $R^5$ is alkyl, aryl, perfluoroalkyl, or perfluoroaryl.

2B. The metallocene compound of paragraph 1B, wherein q is 1 and A is an alkylene or a silylene group, preferably A is $SiR^6R^7$; wherein $R^6$ and $R^7$ are independently an optionally-substituted hydrocarbyl group having 1 to about 20 carbon atoms, the optionally-substituted hydrocarbyl group being linear or branched, saturated or unsaturated, aliphatic or aromatic, and cyclic or acyclic.

3B. The metallocene compound of paragraphs 1B or 2B, wherein Q is $(CH_2)_m$, and m ranges from 0 to about 12.

4B. The metallocene compound of paragraphs 1B-3B, wherein Z is $(CH_2)_2$.

5B. The metallocene compound of paragraphs 1B-4B, wherein $X^1$ and $X^2$ are pentafluorophenoxy.

6B. A catalyst composition comprising: at least one activator and the metallocene compound of any of paragraphs 1B to 5B, or the reaction product thereof.

7B. The catalyst composition of paragraph 6B, wherein the at least one activator comprises an alumoxane, preferably methylalumoxane.

8B. The catalyst composition of paragraphs 6B or 7B, wherein the catalyst composition is disposed on a solid support.

9B. A method comprising providing an olefinic feed; and contacting the catalyst composition of paragraphs 6B to 8B with the olefinic feed under polymerization reaction conditions.

10B. The method of paragraph 9B, wherein the polymerization reaction conditions include hydrogen gas.

To facilitate a better understanding of the embodiments described herein, the following examples of various representative embodiments are given. In no way should the following examples be read to limit, or to define, the scope of the present disclosure.

EXAMPLES

All manipulations were performed in an inert $N_2$ purged glove box unless otherwise stated. All anhydrous solvents were purchased from Fisher Chemical and were degassed and dried over molecular sieves prior to use. Deuterated solvents were purchased from Cambridge Isotope Laboratories and dried over molecular sieves prior to use. n-Butyl lithium (BuLi, 2.5 M solution in hexane), dichlorodimethylsilane ($Me_2SiCl_2$), methyl lithium (MeLi) and methylmagnesium bromide (3.0 M solution in diethyl ether), and pentafluorophenol were purchased from Sigma-Aldrich. Diisobutylaluminum hydride (DIBALH) was obtained from Akzo Nobel Polymer Chemicals LLC, and used as received. Hafnium tetrachloride ($HfCl_4$, 99+%) and lithium tetramethylcyclopentadienide were obtained from Strem chemicals and used as received. ($\eta^5$-Cyclopentadienyl)trichlorohafnium dimethoxyethane ($CpHfCl_3(dme)$), lithium hexenylcyclopentadienide and pentafluorophenylborane were prepared according to literature procedures. $^1H$ NMR measurements were recorded on a 400 MHz Bruker spectrometer.

Unbridged metallocene compounds were synthesized as shown in Schemes 3 through 7 below.

(Cyclopentadienyl)(hexenylcyclopentadienyl)hafniumdichloride [Cp(Cp-hexenyl)HfCl$_2$)]. Cp(Cp-hexenyl)HfCl$_2$) was synthesized as shown in Scheme 3.

Scheme 3

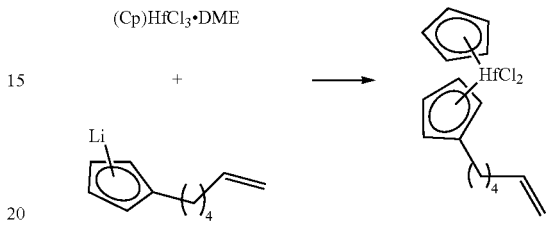

An ethereal solution of precooled lithium-n-hexenyl cyclopentadienide (1.90 g, 12.3 mmol) was combined with a slurry of precooled CpHfCl$_3$.DME (5.42 g, 12.3 mmol) in diethyl ether. The resulting mixture was gradually brought to room temperature and then continuously stirred overnight at room temperature. Volatiles from the reaction mixture were removed in vacuo and extracted with dichloromethane. Solvent removal in vacuo afforded a colorless solid of Cp(Cp-hexenyl)HfCl$_2$ in 5.6 g (98.47%) yield. $^1H$ NMR (400 MHz, CD$_2$Cl$_2$): δ 1.42 (2H, m, hexenyl-CH$_2$), 1.55 (2H, m, hexenyl-CH$_2$), 2.06 (2H, m, hexenyl-CH$_2$), 2.64 (2H, m, hexenyl-CH$_2$), 4.97 (2H, m, hexenyl-CH$_2$), 5.81 (1H, m, hexenyl-CH), 6.11 (2H, m, Cp-CH), 6.23 (2H, m, Cp-CH), 6.36 (4H, s, Cp-CH) ppm.

(Cyclopentadienyl)(hexenylcyclopentadienyl)hafnium dimethyl [Cp(Cp-hexenyl)HfMe$_2$]. Cp(Cp-hexenyl)HfMe$_2$ (Compound 1) was synthesized as shown in Scheme 4.

Scheme 4

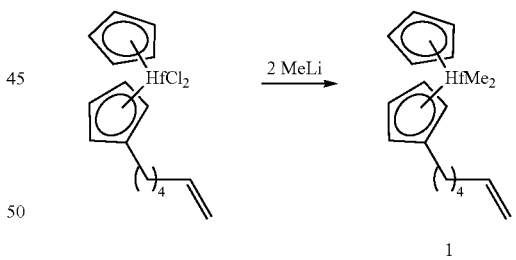

1

A colorless solid of Cp(Cp-hexenyl)HfCl$_2$ (5.42 g, 11.7 mmol) was slurried in diethyl ether and cooled at −25° C. To this solution was added an ethereal solution of MeLi (14.8 mL, 23.7 mmol) dropwise over 15 minutes. The resulting mixture was stirred overnight at room temperature to ensure completion of reaction. Insoluble materials of LiCl and other inorganic salts were removed via filtration over a thick Celite pad packed in a frit. The crude materials were washed with cold hexane to get rid of any organic impurities generated in this step. The resulting solid materials were then dried under vacuum to obtain a brown waxy solid of Cp(Cp-hexenyl)HfMe$_2$ in 4.2 g (85.0%) yield. $^1H$ NMR (400 MHz, C$_6$D$_6$): δ −0.29 (6H, s, HfMe$_2$), 1.33 (2H, m, hexenyl-CH$_2$), 1.47 (2H, m, hexenyl-CH$_2$), 1.96 (2H, m, hexenyl-CH$_2$), 2.35 (2H, m, hexenyl-CH$_2$), 5.01 (2H, m, hexenyl-CH$_2$), 5.40 (1H, m, hexenyl-CH), 5.58 (2H, m, Cp-CH), 5.71 (2H, m, Cp-CH), 5.71 (5H, s, Cp-CH) ppm.

(Cyclopentadienyl)(hexenylcyclopentadienyl)hafnium-bis(pentafluorophenoxide), [Cp(Cp-hexenyl)Hf(OC$_6$F$_5$)$_2$]. Cp(Cp-hexenyl)Hf(OC$_6$F$_5$)$_2$ (Compound 2) was synthesized as shown in Scheme 5.

Scheme 5

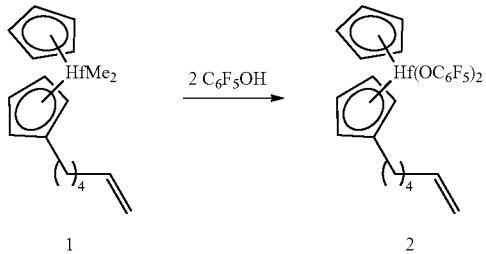

Cp(Cp-hexenyl)HfMe$_2$ (3.7 g, 8.8 mmol) was dissolved in toluene and cooled to −25° C. To this solution was added a precooled toluene solution of C$_6$F$_5$OH (3.236 g, 17.6 mmol) dropwise over 5 minutes. The resulting mixture was stirred 2 hours at room temperature, and then volatiles were removed in vacuo. The crude materials were washed with cold hexane to remove organic soluble impurities. The resulting materials were dried under vacuum to obtain a pale brown waxy solid of Cp(Cp-hexenyl)Hf(OC$_6$F$_5$)$_2$ in 6.2 g (93.2%) yield. $^1$H NMR (400 MHz, C$_6$D$_6$): δ 1.35 (4H, m, hexenyl-CH$_2$), 1.90 (2H, m, hexenyl-CH$_2$), 2.32 (2H, m, hexenyl-CH$_2$), 4.96 (2H, m, hexenyl-CH$_2$), 5.00 (1H, m, hexenyl-CH), 5.71 (4H, m, Cp-CH), 5.79 (1H, s, Cp-CH), 5.81 (4H, s, Cp-CH) ppm. $^{19}$F NMR (400 MHz, C$_6$D$_6$): δ −171.7 (m), −165.6 (m), −163.3 (m) ppm.

(Cyclopentadienyl)(diisobutylaluminum-hexyl-cyclopentadienyl)hafnium-bis(pentafluorophenoxide), [Cp($^i$Bu$_2$Al—(CH$_2$)$_6$-Cp)Hf(OC$_6$F$_5$)$_2$]. Cp($^i$Bu$_2$Al—(CH$_2$)$_6$-Cp)Hf(OC$_6$F$_5$)$_2$ (Compound 3) was synthesized as shown in Scheme 6.

Scheme 6

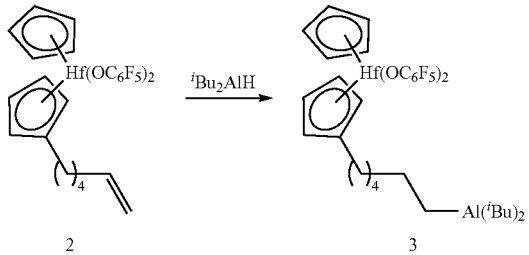

A precooled solution of DIBAL-H (1.163 g, 8.2 mmol) in toluene was added to a precooled toluene solution of Cp(Cp-hexenyl)Hf(OC$_6$F$_5$)$_2$ (6.2 g, 8.2 mmol). The resulting mixture was stirred overnight at room temperature. Insoluble materials were removed and subsequently all volatiles were removed in vacuo. The resulting solid materials were then dried under vacuum to obtain Cp($^i$Bu$_2$Al—(CH$_2$)$_6$-Cp)Hf(OC$_6$F$_5$)$_2$ as a thick oily product in 6.1 g (82.8%) yield. $^1$H NMR (400 MHz, C$_6$D$_6$): δ 0.45 (4H, d, $^i$Bu$_2$Al—CH$_2$), 1.04 (12H, d, $^i$Bu$_2$Al—CH$_3$), 0.94 (2H, m, hexenyl-CH$_2$), 1.28 (4H, m, hexenyl-CH$_2$), 1.45 (2H, m, hexenyl-CH$_2$), 1.56 (2H, m, hexenyl-CH$_2$), 2.04 (2H, sept, $^i$Bu$_2$Al—CH), 2.30 (2H, m, hexenyl-CH$_2$), 5.56 (2H, m, Cp-CH), 5.79 (7H, m, Cp-CH) ppm. $^{19}$F NMR (400 MHz, C$_6$D$_6$): δ −172.7 (m), −171.9 (m), −170.6 (m), −166.0 (m), −165.7 (m), −164.4 (m), −163.5 (m), −163.2 (m), −161.0 (m), −160.7 (m), −154.5 (m), −153.6 (m) ppm.

(Cyclopentadienyl)(bis-pentafluorophenylborane-hexyl-cyclopentadienyl)hafnium-bis(pentafluorophenoxide), [Cp((C$_6$F$_5$)$_2$B(CH$_2$)$_6$Cp)Hf(OC$_6$F$_5$)$_2$]. Cp((C$_6$F$_5$)$_2$B(CH$_2$)$_6$Cp)Hf(OC$_6$F$_5$)$_2$ (Compound 4) was synthesized as shown in Scheme 7.

Scheme 7

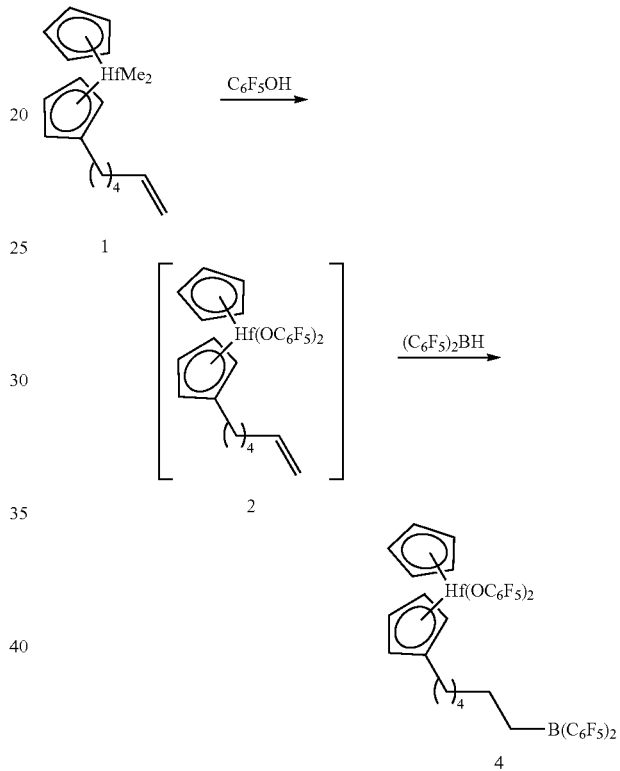

Cp(Cp-hexenyl)HfMe$_2$ (3.0 g, 7.1 mmol) was dissolved in toluene and cooled to −25° C. To this solution was added a precooled toluene solution of C$_6$F$_5$OH (2.624 g, 14.3 mmol) dropwise over 5 minutes. The resulting mixture was stirred 1 hour at room temperature to obtain an intermediate product (not isolated) and then solid (C$_6$F$_5$)$_2$BH (2.624 g, 14.3 mmol) was added. The resulting mixture was stirred 3 hours at room temperature, during which time a clear solution formed. The volatiles from the resulting mixture were removed in vacuo and the crude materials were washed with cold hexane to afford Cp((C$_6$F$_5$)$_2$B(CH$_2$)$_6$Cp)Hf(OC$_6$F$_5$)$_2$ as a waxy pale brown material in 7.3 g (92.9%) yield. $^1$H NMR (400 MHz, C$_6$D$_6$): δ 1.15 (2H, m, hexenyl-CH$_2$), 1.28 (3H, m, hexenyl-CH$_3$), 1.42 (4H, m, hexenyl-CH$_2$), 1.88 (2H, m, hexenyl-CH$_2$), 2.38 (2H, m, hexenyl-CH$_2$), 5.51 (3H, s, Cp-CH), 5.74 (1H, s, Cp-CH), 5.82 (4H, s, Cp-CH) ppm. $^{19}$F NMR (400 MHz, C$_6$D$_6$): δ −165.8 (m), −163.4 (m), −160.9 (m), −159.9 (m), −147.1 (m), −141.7 (m), −130.5 (m), −128.6 (m) ppm.

Bridged metallocene compounds were synthesized as shown in Schemes 8 through 14 below.

Dimethylsilyl-(tetramethylcyclopentadiene)(n-hexenyl-cyclopentadiene), [Me₂Si(Cp-H)(HexenylCp-H)]. Me₂Si(Cp-H)(HexenylCp-H) (Compound 5) was synthesized as shown in Scheme 8.

Scheme 8

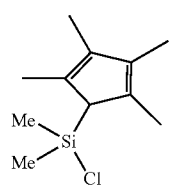
+
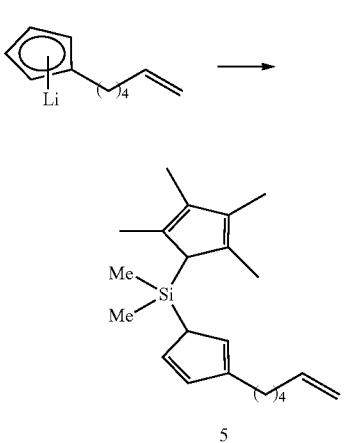

Neat Me₂Si(Me₄Cp)Cl (4.74 g, 22.1 mmol) was dissolved in 70 mL of THF and cooled to −25° C. To this solution was added a precooled THF solution of lithium hexenyl-cyclopentadienide (3.40 g, 22.1 mmol) dropwise over a period of 5 minutes. The resulting mixture was stirred overnight at room temperature to ensure completion of the reaction. Volatiles from the reaction mixture were removed in vacuo. The crude materials were extracted into hexane, and subsequent solvent removal under vacuum afforded a thick yellow viscous oil of Me₂Si(Me₄Cp-H)(HexenylCp-H) in 7.13 g (98.9%) yield. ¹H NMR (400 MHz, THF-d₈): δ −0.12 (4H, d, SiMe₂), 0.16 (2H, d, SiMe₂), 1.40 (2H, m, hexenyl-CH₂), 1.56 (2H, m, hexenyl-CH₂), 1.91 (12H, m, Cp-CH₃), 2.01 (2H, m, hexenyl-CH₂), 2.35 (2H, m, hexenyl-CH₂), 2.92 (2H, m, Cp-CH), 5.01 (2H, m, hexenyl-CH₂), 5.78 (1H, m, hexenyl-CH), 6.08 (2H, m, Cp-CH), 6.42 (2H, m, Cp-CH), 6.57 (2H, m, Cp-CH) ppm.

Lithium dimethylsilyl-(tetramethylcyclopentadienide)(n-hexenylcyclopentadienide), [Me₂Si(Me₄Cp)(HexenylCp)Li₂]. [Me₂Si(Me₄Cp)(HexenylCp)Li₂] (Compound 6) was synthesized as shown in Scheme 9.

Scheme 9

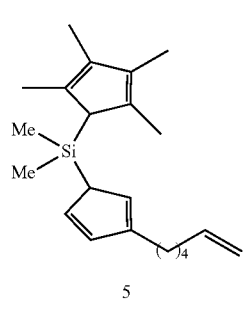
2 BuLi →

-continued

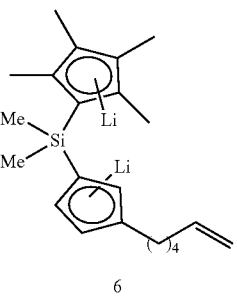

A hexane solution of n-butyl lithium (17.7 mL, 44.2 mmol, 2.5 M solution) was added dropwise to a precooled THF solution of Me₂Si(Me₄Cp-H)(HexenylCp-H) (7.13 g, 21.9 mmol) over a period of 10-15 minutes. The resulting mixture was gradually warmed to room temperature and then continuously stirred overnight. Volatiles from the reaction mixture were removed in vacuo. The crude solid materials were thoroughly washed with hexane to remove any soluble impurities, and the resulting solid was dried under vacuum to obtain a colorless crystalline solid of Me₂Si(Me₄Cp)(HexenylCp)Li₂ in 7.16 g (96.9%) yield. ¹H NMR (400 MHz, C₆D₆): δ 0.45 (6H, s, SiMe₂), 1.47 (4H, m, hexenyl-CH₂), 1.87 (6H, s, Cp-CH₃), 2.02 (2H, m, hexenyl-CH₂), 2.07 (6H, s, Cp-CH₃), 2.43 (2H, m, hexenyl-CH₂), 4.90 (2H, m, hexenyl-CH₂), 5.58 (1H, t, hexenyl-CH), 5.74 (3H, m, Cp-CH) ppm.

Dimethylsilyl-(tetramethylcyclopentadienyl)(n-hexenyl-cyclopentadienyl)hafnium dichloride, [Me₂Si(Me₄Cp)(HexenylCp)HfCl₂]. Me₂Si(Me₄Cp)(HexenylCp)HfCl₂ (Compound 7) was synthesized as shown in Scheme 10.

Scheme 10

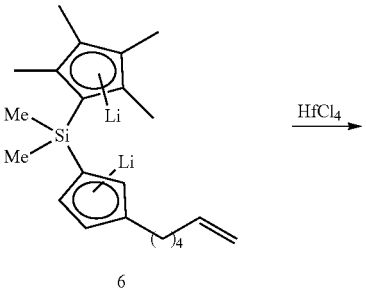 HfCl₄ →

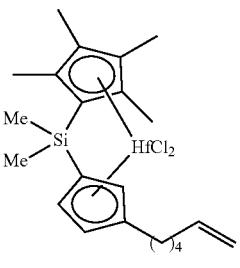

Solid HfCl$_4$ (6.75 g, 21.0 mmol) was added to a precooled diethyl ether (300 mL) solution of Me$_2$Si(Cp)(HexenylCp)Li$_2$ (7.13 g, 21.0 mmol) at −25° C. The resulting mixture was stirred overnight at room temperature. Volatiles from the reaction mixture were removed in vacuo and the crude material was extracted into dichloromethane. Solvent removal under vacuum afforded a pale yellow thick oil of Me$_2$Si(Cp)(HexenylCp)HfCl$_2$ in 12.0 g (99.3%) yield. $^1$H NMR (400 MHz, C$_6$D$_6$): δ 0.41 (3H, m, SiMe$_2$), 0.43 (3H, m, SiMe$_2$), 1.25 (2H, m, hexenyl-CH$_2$), 1.35 (2H, m, hexenyl-CH$_2$), 1.55 (2H, m, hexenyl-CH$_2$), 1.75 (3H, s, Cp-CH$_3$), 1.82 (3H, s, Cp-CH$_3$), 2.05 (3H, s, Cp-CH$_3$), 2.14 (3H, s, Cp-CH$_3$), 2.79 (2H, m, hexenyl-CH$_2$), 4.97 (2H, m, hexenyl-CH$_2$), 5.10 (1H, t, hexenyl-CH), 5.39 (1H, m, Cp-CH), 5.72 (1H, m, Cp-CH), 6.61 (1H, m, Cp-CH) ppm.

Dimethylsilyl-(tetramethylcyclopentadienyl)(n-hexenyl-cyclopentadienyl)hafnium dimethyl, [Me$_2$Si(Me$_4$Cp)(HexenylCp)HfMe$_2$]. Me$_2$Si(Me$_4$Cp)(HexenylCp)HfMe$_2$ (Compound 8) was synthesized as shown in Scheme 11.

Scheme 11

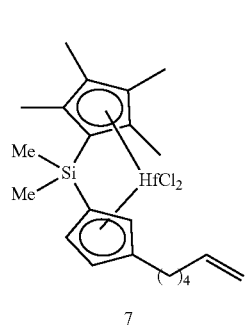

7

2 MeMgBr →

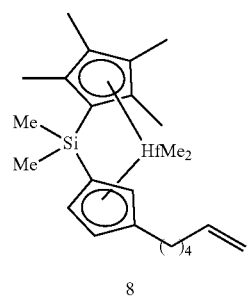

8

An ethereal solution of MeMgBr (14.5 mL, 42.2 mmol) was added dropwise to a precooled diethyl ether solution of Me$_2$Si(Cp)(HexenylCp)HfCl$_2$ (12.0 g, 21.0 mmol) over a period of 10-15 minutes at −25° C. The resulting mixture was stirred overnight at room temperature to ensure completion of reaction. Volatiles from the reaction mixture were removed in vacuo and the crude materials were then extracted into hexane. Solvent removal in vacuo afforded a brown oily material of Me$_2$Si(Cp)(HexenylCp)HfMe$_2$ in 8.45 g (75.8%) yield. $^1$H NMR (400 MHz, C$_6$D$_6$): δ −0.55 (3H, s, HfMe$_2$), −0.45 (3H, s, HfMe$_2$), 0.42 (3H, m, SiMe$_2$), 0.43 (3H, m, SiMe$_2$), 1.02 (2H, m, hexenyl-CH$_2$), 1.43 (2H, m, hexenyl-CH$_2$), 1.68 (3H, s, Cp-CH$_3$), 1.74 (3H, s, Cp-CH$_3$), 1.80 (2H, m, hexenyl-CH$_2$), 1.97 (6H, s, Cp-CH$_3$), 2.63 (2H, m, hexenyl-CH$_2$), 5.09 (3H, m, hexenyl-CH2 and —CH), 5.77 (2H, m, Cp-CH), 6.49 (1H, m, Cp-CH) ppm.

Dimethylsilyl-(tetramethylcyclopentadienyl)(n-hexenyl-cyclopentadienyl)hafnium bis(pentafluorophenoxide), [Me$_2$Si(Me$_4$Cp)(HexenylCp)Hf(OC$_6$F$_5$)$_2$]. Me$_2$Si(Me$_4$Cp)(HexenylCp)Hf(OC$_6$F$_5$)$_2$ (Compound 9) was synthesized as shown in Scheme 12.

Scheme 12

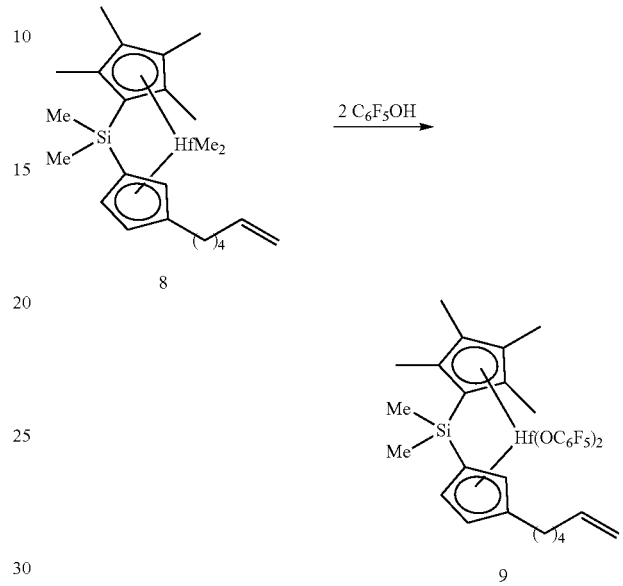

Me$_2$Si(Cp)(HexenylCp)HfMe$_2$ (8.22 g, 15.4 mmol) was dissolved in toluene (200 mL) and cooled to −25° C. To this solution was added dropwise a solution of C$_6$F$_5$OH (5.676 g, 30.8 mmol) in cold toluene. The resulting mixture was gradually warmed to room temperature and then stirred for two hours at room temperature. Volatiles were then removed in vacuo. The resulting solid was washed with cold hexane to obtain Me$_2$Si(Cp)(HexenylCp)Hf(OC$_6$F$_5$)$_2$ as a brown oily solid in 12.9 g (96.3%) yield. $^1$H NMR (400 MHz, C$_6$D$_6$): δ 0.56 (3H, m, SiMe$_2$), 0.57 (3H, m, SiMe$_2$), 1.13 (2H, m, hexenyl-CH$_2$), 1.30 (2H, m, hexenyl-CH$_2$), 1.57 (3H, s, Cp-CH$_3$), 1.79 (3H, s, Cp-CH$_3$), 1.87 (3H, s, Cp-CH$_3$), 1.98 (3H, s, Cp-CH$_3$), 2.30 (2H, m, hexenyl-CH$_2$), 4.98 (2H, m, hexenyl-CH$_2$), 5.41 (2H, m, hexenyl-CH), 5.63 (2H, m, Cp-CH), 5.98 (1H, m, Cp-CH) ppm. $^{19}$F NMR (400 MHz, C$_6$D$_6$): δ −173 (m), −172 (m), −168 (m), −166 (m), −165 (m), −163 (m), −161 (m) ppm.

Dimethylsilyl-(tetramethylcyclopentadienyl)(diisobutyl-aluminum-hexyl-cyclopentadienyl)hafnium bis(pentafluorophenoxide), [Me$_2$Si(Me$_4$Cp)($^i$Bu$_2$Al-hexyl-Cp)Hf(OC$_6$F$_5$)$_2$]. Me$_2$Si(Me$_4$Cp)($^i$Bu$_2$Al-hexyl-Cp)Hf(OC$_6$F$_5$)$_2$ (Compound 10) was synthesized as shown in Scheme 13.

Scheme 13

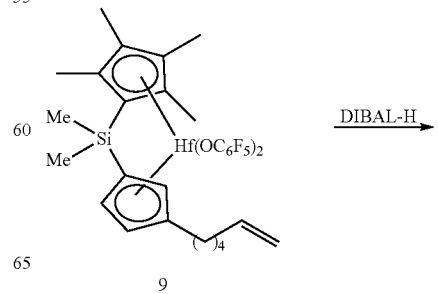

9

DIBAL-H →

-continued

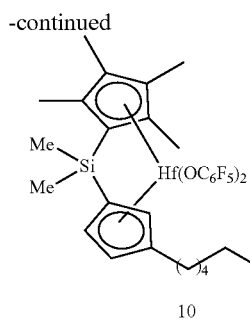

10

Me$_2$Si(Me$_4$Cp)(hexenylCp)Hf(OC$_6$F$_5$)$_2$ (6.8 g, 7.8 mmol) was dissolved in toluene (150 mL) and chilled at −25° C. To this solution was added DIBAL-H (1.11 g, 7.8 mmol) in toluene dropwise. The resulting mixture was stirred overnight at room temperature. $^1$H and $^{19}$F NMR spectra of the crude reaction mixture showed complete conversion of the reactant, as well as disappearance of the vinyl group accompanied by reappearance of an ethyl group via Al—H insertion. Volatiles were removed in vacuo and crude materials were washed with cold hexane to obtain Me$_2$Si(Me$_4$Cp)($^i$Bu$_2$Al—(CH$_2$)$_6$-Cp)Hf(OC$_6$F$_5$)$_2$ as a yellowish solid in 6.9 g (87.2%) yield. $^1$H NMR (400 MHz, C$_6$D$_6$): δ 0.38 (2H, d, hexenyl-CH$_2$), 0.46 (6H, m, SiMe$_2$), 0.54 (4H, d, $^i$Bu$_2$Al—CH$_2$), 1.05 (12H, d, $^i$Bu$_2$Al—CH$_3$), 1.57 (3H, s, Cp-CH$_3$), 1.65 (2H, m, hexenyl-CH$_2$), 1.77 (3H, s, Cp-CH$_3$), 1.86 (3H, s, Cp-CH$_3$), 1.96 (3H, s, Cp-CH$_3$), 2.03 (4H, m, $^i$Bu$_2$Al—CH and hexenyl-CH$_2$), 2.22 (2H, d, hexenyl-CH$_2$), 2.36 (2H, m, hexenyl-CH$_2$), 5.33 (1H, m, Cp-CH), 5.56 (1H, m, Cp-CH) ppm, 5.99 (1H, m, Cp-CH) ppm. $^{19}$F NMR (400 MHz, C$_6$D$_6$): δ −172.7, −172.2, −167.8, −165.0, −162.6, −160.9, −160.6, −154.5, −153.7 (m) ppm.

Dimethylsilyl-(cyclopentadienyl)(bis-pentafluorophenyl-borane-hexyl-cyclopentadienyl)hafnium bis(pentafluoro-phenoxide), [Me$_2$Si(Cp)((C$_6$F$_5$)$_2$B-hexyl-Cp)Hf(OC$_6$F$_5$)$_2$]. Me$_2$Si(Cp)((C$_6$F$_5$)$_2$B-hexyl-Cp)Hf(OC$_6$F$_5$)$_2$ (Compound 11) was synthesized as shown in Scheme 14.

Scheme 14

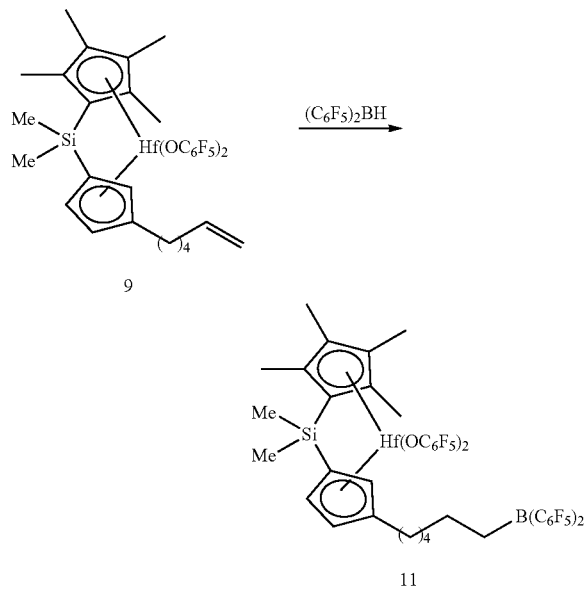

Me$_2$Si(Me$_4$Cp)(hexenylCp)Hf(OC$_6$F$_5$)$_2$ (4.42 g, 5.1 mmol) was dissolved in toluene (150 mL) and chilled at −25° C. To this solution was added solid (C$_6$F$_5$)$_2$BH (1.76 g, 5.1 mmol), and resulting mixture was stirred overnight at room temperature. $^1$H and $^{19}$F NMR spectra of the crude reaction mixture showed complete conversion of the reactant, as well as disappearance of the vinyl group accompanied by reappearance an ethyl group via Al—H insertion. Volatiles were removed in vacuo and crude materials were washed with cold hexane to obtain Me$_2$Si(Me$_4$Cp)((C$_6$F$_5$)$_2$B—(CH$_2$)$_6$-Cp)Hf(OC$_6$F$_5$)$_2$ as a brown oily compound in 4.0 g (64.7%) yield. $^1$H NMR (400 MHz, C$_6$D$_6$): δ 0.55 (6H, m, SiMe$_2$), 1.08 (2H, d, hexenyl-CH$_2$), 1.37 (4H, d, hexenyl-CH$_2$), 1.57 (2H, d, hexenyl-CH$_2$), 1.79 (3H, s, Cp-CH$_3$), 1.86 (6H, s, Cp-CH$_3$), 1.97 (3H, s, Cp-CH$_3$), 2.17 (2H, d, hexenyl-CH$_2$), 2.37 (2H, d, hexenyl-CH$_2$), 5.42 (1H, m, Cp-CH), 5.61 (1H, m, Cp-CH), 6.02 (1H, m, Cp-CH) ppm. $^{19}$F NMR (400 MHz, C$_6$D$_6$): δ −172.6, −172.1, −167.8, −165.9. −164.5, −162.6, −161.4, −160.8, −159.8, −147.0, −146.8, −130.4, −129.7, −128.6 (s) ppm.

Supported catalyst preparation. 2.4 mmol of selected compounds above were individually combined with a slurry of 60.0 g SMAO in 150 mL toluene in a Celestir vessel. The resulting slurry was stirred at room temperature for about 3 hours and filtered. The filtrate was then washed with toluene (1×10 mL) and then hexane (2×10 mL). The supported catalyst was then dried in vacuo overnight at room temperature to obtain approx. 61.5 g light yellow colored supported catalyst. Compounds prepared above and supported upon SMAO are designated by the identifier SMAO and their compound number (e.g., SMAO-1) in Table 1 below showing high-throughput polymerization data.

SMAO Preparation: Methylalumoxane treated silica was prepared in a manner similar to the following: In a 4 L stirred vessel in a drybox, methylalumoxane (MAO, 30 wt. % in toluene, approx. 1,000 grams) is added along with approx. 2,000 g of toluene. This solution is then stirred at 60 RPM for 5 minutes. Next, approx. 800 grams of ES-70-875 silica is added to the vessel. This slurry is then heated at 100° C. and stirred at 120 RPM for 3 hours. The temperature is then reduced to 25° C. and cooled to temperature over 2 hours. Once cooled, the vessel is set to 8 RPM and placed under vacuum for 72 hours. After emptying the vessel and sieving the supported MAO, approximately 1,100 g of supported MAO will be collected.

ES-70-875 silica is ES70™ silica (PQ Corporation, Malvern, Pa.) that has been calcined at approx. 875° C. Specifically, the ES70™ silica is calcined at 880° C. for four hours after being ramped to 880° C. according to the following ramp rates:

| ° C. | ° C./h | ° C. |
| --- | --- | --- |
| ambient | 100 | 200 |
| 200 | 50 | 300 |
| 300 | 133 | 400 |
| 400 | 200 | 800 |
| 800 | 50 | 880 |

GPC-4D Characterization of Polymer Product (Example 1): Unless otherwise indicated, the distribution and moments of molecular weight (e.g., Mw, Mn, Mz, Mw/Mn, etc.), the co-monomer content (C$_2$, C$_3$, C$_6$, etc.), and the branching index (g') of the polymers produced herein were determined by using a high temperature Gel Permeation Chromatography (Polymer Char GPC-IR) instrument equipped with a multi-channel band filter based Infrared detector IR5, an 18-angle light scattering detector, and a viscometer (GPC-4D). Three Agilent PLgel 10-μm Mixed-B LS columns were used to affect polymer separation. Aldrich reagent grade 1,2,4-trichlorobenzene (TCB) containing 300 ppm butylated hydroxytoluene (BHT) as an antioxidant stabilizer was used as the mobile phase. The TCB mixture was filtered through a 0.1-μm Teflon filter and degassed with an online degasser before entering the GPC instrument. The nominal flow rate was 1.0 mL/min, and the nominal injection volume was 200 μL. The whole system including transfer lines, columns, and detectors was housed in an oven maintained at 145° C. To conduct an analysis, a given amount of polymer sample was weighed and sealed in a standard vial with 80 μL of heptane flow marker added to the sealed sample. After loading the vial in the autosampler, the polymer was automatically dissolved in the instrument with 8 mL added TCB solvent. The polymer was dissolved at 160° C. with continuous shaking for about 1 hour for most polyethylene samples or for about 2 hours for polypropylene samples. The TCB densities used to calculate concentrations are 1.463 g/mL at room temperature and 1.284 g/mL at 145° C. The sample concentrations ranged from 0.2 to 2.0 mg/mL, with lower concentrations being used for higher molecular weight samples.

The concentration at each point in the chromatogram was calculated from the baseline-subtracted IR5 broadband signal intensity (I) using Equation 1, $$c = \beta I \qquad \text{(Equation 1)}$$

where c is the concentration and $\beta$ is the mass constant. The mass recovery was calculated from the ratio of the integrated area of the concentration chromatograph over elution volume and the injection mass, which is equal to the predetermined concentration multiplied by the injection loop volume. The conventional molecular weight (IR MW) was determined by combining a universal calibration relationship with the column calibration, which is performed with a series of monodispersed polystyrene (PS) standards ranging from 700 to 10M g/mole. The molecular weight at each elution volume was calculated with Equation 2, $$\log M = \frac{\log(K_{PS}/K)}{\alpha + 1} + \frac{\alpha_{PS} + 1}{\alpha + 1}\log M_{PS} \qquad \text{(Equation 2)}$$

where the variables with a "PS" subscript stand for polystyrene while those without a subscript are for the test samples. In this method, $\alpha_{PS}=0.67$ and $K_{PS}=0.000175$, while $\alpha$ and K for other materials are as calculated and published in literature (see Sun, T. et al. *Macromolecules* 2001, 34, pg. 6812), except that for purposes of this disclosure, $\alpha=0.695$ and $K=0.000579$ for linear ethylene polymers, $\alpha=0.705$ and $K=0.0002288$ for linear propylene polymers, $\alpha=0.695$ and $K=0.000181$ for linear butylene polymers, $\alpha=0.695$ and $K=0.000579[1-0.0087(w2b)+0.000018(w2b)^2]$ for ethylene-butene copolymer where w2b is a bulk weight percent of butene co-monomer, $\alpha=0.695$ and $K=0.000579[1-0.0075(w2b)]$ for ethylene-hexene copolymer where w2b is a bulk weight percent of hexene co-monomer, and $\alpha=0.695$ and $K=0.000579[1-0.0077(w2b)]$ for ethylene-octene copolymer where w2b is a bulk weight percent of octene co-monomer. Concentrations are expressed in g/cm³, molecular weight is expressed in g/mole, and intrinsic viscosity (K in the Mark-Houwink equation) is expressed in dL/g unless otherwise noted.

The co-monomer composition was determined by the ratio of the IR5 detector intensity corresponding to the $CH_2$ and $CH_3$ channel calibrated with a series of PE and PP homopolymer/copolymer standards whose nominal values are predetermined by NMR or FTIR. In particular, this calculation provides the amount of methyl groups per 1,000 total carbons ($CH_3$/1000TC) as a function of molecular weight. The short-chain branch (SCB) content per 1000TC (SCB/1000TC) is then computed as a function of molecular weight by applying a chain-end correction to the $CH_3$/1000TC function, assuming each chain to be linear and terminated by a methyl group at each end. The weight percent w2 of co-monomer is then obtained from Equation 3, in which f is 0.3, 0.4, 0.6, 0.8, . . . for C3, C4, C6, C8, . . . co-monomers, respectively.

$$w2 = f*SCB/1000TC \qquad \text{(Equation 3)}$$

The bulk composition of the polymer from the GPC-IR and GPC-4D analyses was obtained by considering the entire signals of the $CH_3$ and $CH_2$ channels between the integration limits of the concentration chromatogram. First, the following ratio was obtained (Equation 4).

$$\text{Bulk } IR \text{ ratio} = \frac{\text{Area of } CH_3 \text{ signal within integration limits}}{\text{Area of } CH_2 \text{ signal within integration limits}} \qquad \text{(Equation 4)}$$

The same calibration of the $CH_3$ and $CH_2$ signal ratio, as mentioned previously in obtaining the $CH_3$/1000TC as a function of molecular weight, was then applied to obtain the bulk $CH_3$/1000TC. A bulk methyl chain ends per 1,000TC (bulk $CH_3$end/1000TC) was obtained by weight-averaging the chain-end correction over the molecular-weight range using Equations 5 and 6.

$$w2b = f*\text{bulk } CH3/1000TC \qquad \text{(Equation 5)}$$

$$\text{bulk SCB/1000TC} = \text{bulk CH3/1000TC} - \text{bulk CH3end/1000TC} \qquad \text{(Equation 6)}$$

The bulk SCB/1000TC was converted to bulk w2 in the same manner as described above.

The LS detector was an 18-angle Wyatt Technology High Temperature DAWN HELEOSII. The LS molecular weight (M) at each point in the chromatogram was determined by analyzing the LS output using the Zimm model for static light scattering (*Light Scattering from Polymer Solutions*; Huglin, M. B., Ed.; Academic Press, 1972.), as shown for Equation 7.

$$\frac{K_o c}{\Delta R(\theta)} = \frac{1}{MP(\theta)} + 2A_2 c \qquad \text{(Equation 7)}$$

In Equation 7, $\Delta R(\theta)$ is the measured excess Rayleigh scattering intensity at scattering angle $\theta$, c is the polymer concentration determined from the IR5 analysis, $A_2$ is the second virial coefficient, $P(\theta)$ is the form factor for a monodisperse random coil, and $K_o$ is the optical constant for the system as expressed by Equation 8

$$K_o = \frac{4\pi^2 n^2 (dn/dc)^2}{\lambda^4 N_A} \qquad \text{(Equation 8)}$$

In Equation 8, $N_A$ is Avogadro's number, and (dn/dc) is the refractive index increment for the system. The refractive index, n, is 1.500 for TCB at 145° C. and λ=665 nm. For analyzing polyethylene homopolymers, ethylene-hexene copolymers, and ethylene-octene copolymers, dn/dc=0.1048 ml/mg and $A_2$=0.0015; for analyzing ethylene-butylene copolymers, dn/dc=0.1048[1−0.00126(w2)] ml/mg and $A_2$=0.0015, where w2 is weight percent butylene co-monomer.

A high temperature Agilent (or Viscotek Corporation) viscometer, which has four capillaries arranged in a Wheatstone bridge configuration with two pressure transducers, was used to determine specific viscosity. One transducer measures the total pressure drop across the detector, and the other, positioned between the two sides of the bridge, measures a differential pressure. The specific viscosity, $\eta_s$, for the solution flowing through the viscometer was calculated from their outputs. The intrinsic viscosity, $[\eta]$, at each point in the chromatogram was calculated from the equation $[\eta]=\eta_s/c$, where c is concentration and is determined from the IR5 broadband channel output. The viscosity MW at each point was calculated as $M=K_{PS}M^{\alpha_{PS}+1}/[\eta]$, where $\alpha_{ps}$ is 0.67 and $K_{ps}$ is 0.000175.

The branching index ($g'_{vis}$) was calculated using the output of the GPC-IR5-LS-VIS method as follows. The average intrinsic viscosity, $[\eta]_{avg}$, of the sample was first calculated using Equation 9, $$[\eta]_{avg} = \frac{\sum c_i[\eta]_i}{\sum c_i} \quad \text{(Equation 9)}$$

where the summations are over the chromatographic slices, i, between the integration limits.

The branching index $g'_{vis}$ is defined by Equation 10, $$g'_{vis} = \frac{[\eta]_{avg}}{KM_v^\alpha} \quad \text{(Equation 10)}$$

where $M_v$ is the viscosity-average molecular weight based on molecular weights determined by LS analysis and K and a are for the reference linear polymer. For purposes of this disclosure, α=0.695 and K=0.000579 for linear ethylene polymers, α=0.705 and K=0.0002288 for linear propylene polymers, α=0.695 and K=0.000181 for linear butylene polymers, α=0.695 and K=0.000579[1−0.0087(w2b)+0.000018(w2b)²)] for ethylene-butylene copolymer where w2b is a bulk weight percent of butylene co-monomer, α=0.695 and K=0.000579[1−0.0075(w2b)] for ethylene-hexene copolymer where w2b is a bulk weight percent of hexene co-monomer, and α=0.695 and K=0.000579[1−0.0077(w2b)] for ethylene-octene copolymer where w2b is a bulk weight percent of octene co-monomer. Concentrations are expressed in g/cm³, molecular weight is expressed in g/mole, and intrinsic viscosity (K in the Mark-Houwink equation) is expressed in dL/g unless otherwise noted. Calculation of the w2b values is as discussed above.

Melt index (MI, 190° C., 2.16 kg), high load melt index (HLMI, 190° C., 21.6 kg) and melt index ratio (MIR, HLMI/MI) are determined according to ASTM D 1238.

Density is determined according to ASTM D 1505.

Bulk density is determined as follows: The resin is poured via a ⅞" diameter funnel into a fixed volume cylinder of 400 cc. The bulk density is then measured as the weight of resin in the cylinder divided by the 400 cc to give a value in g/cc.

EXAMPLE A: High-Throughput Polymerization Reaction Testing. High-throughput polymerization of ethylene with variable amounts of 1-hexene was carried out for certain of Compounds 1-11 using a fixed amount of supported catalyst.

Polymerizations were performed in a parallel pressure reactor (PPR) as generally described in U.S. Pat. Nos. 6,306,658; 6,455,316; and 6,489,168; PCT Application Publication WO 2000/009255; and *J. Am. Chem. Soc.*, 2003, 125, pp. 4306-4317, each of which is fully incorporated herein by reference to the extent not inconsistent with this specification. The desired temperatures, pressures, quantities of chemicals used (e.g., catalysts, activators, scavengers, etc.) may vary from experiment to experiment, and specific values are given in the Table where data are presented.

High Throughput Ethylene-1-hexene Copolymerization. Supported catalysts were tested in a high throughput unit in slurry ethylene-1-hexene copolymerization. Conditions were as follows.

Preparation of catalyst slurry for high throughput run: In a dry box, 45 mg of supported catalyst (1.79 micromoles of catalyst per 45 mgs of SMAO) was weighed into a 20 ml glass vial. 15 ml of toluene was added to the vial to make a slurry that contained 3 mg supported catalyst/ml slurry. The resulting mixture was vortexed prior to injection.

High Throughput Polymerizations: Transition metal compounds were supported as detailed in the examples above. Solvents, polymerization grade toluene and isohexane were supplied by ExxonMobil Chemical Company and thoroughly dried and degassed prior to use. Polymerization grade ethylene was used and further purified by passing it through a series of columns: 500 cc Oxyclear cylinder from Labclear (Oakland, Calif.) followed by a 500 cc column packed with dried 3 Å molecular sieves purchased from Aldrich Chemical Company, and a 500 cc column packed with dried 5 Å molecular sieves purchased from Aldrich Chemical Company. TnOAl (tri-n-octylaluminum, neat) was used as a 2 mmol/L solution in toluene.

Reactor Description and Preparation: Polymerizations were conducted in an inert atmosphere ($N_2$) drybox using autoclaves equipped with an external heater for temperature control, glass inserts (internal volume of reactor=22.5 mL), septum inlets, regulated supply of nitrogen, ethylene and hexene, and equipped with disposable PEEK mechanical stirrers (800 RPM). The autoclaves were prepared by purging with dry nitrogen prior to use.

Ethylene/1-hexene Copolymerization: The reactor was prepared as described above, and then purged with ethylene. Isohexane, 1-hexene and TnOAl were added via syringe at room temperature and atmospheric pressure. The reactor was then brought to process temperature (85° C.) and charged with ethylene to process pressure (130 psig=896 kPa) while stirring at 800 RPM. The transition metal compound (100 μL of a 3 mg/mL toluene slurry, unless indicated otherwise) was added via syringe with the reactor at process conditions. TnOAl was used as 200 μL of a 20 mmol/L in isohexane solution. Ethylene was allowed to enter (through the use of computer controlled solenoid valves) the autoclaves during polymerization to maintain reactor gauge pressure (+/−2 psig). Reactor temperature was monitored and typically maintained within +/−1° C. Polymerizations were halted by addition of approximately 50 psi $O_2$/Ar (5 mol % $O_2$) gas mixture to the autoclaves for approximately 30 seconds. The polymerizations were quenched after a predetermined cumulative amount of ethylene had been added or for a maximum of 45 minutes polymerization time. The final conversion (in psi) of ethylene added/consumed is reported in Table 1, in addition to the quench time for each run. The reactors were cooled and vented. The polymer was isolated after the solvent was removed in vacuo. Yields reported include total weight of polymer and residual catalyst.

The resultant polymer was analyzed by Rapid GPC (see below) to determine the molecular weight.

To determine various molecular weight related values by GPC, high temperature size exclusion chromatography was performed using an automated "Rapid GPC" system as generally described in U.S. Pat. Nos. 6,491,816; 6,491,823; 6,475,391; 6,461,515; 6,436,292; 6,406,632; 6,175,409; 6,454,947; 6,260,407; and 6,294,388. This apparatus has a series of three 30 cm×7.5 mm linear columns, each containing PLgel 10 um, Mix B. The GPC system was calibrated using polystyrene standards ranging from 580 g/mol-3,390,000 g/mol. The system was operated at an eluent flow rate of 2.0 mL/min and an oven temperature of 165° C. 1,2,4-trichlorobenzene was used as the eluent. The polymer samples were dissolved in 1,2,4-trichlorobenzene at a concentration of 0.1-0.9 mg/mL. 250 μL of a polymer solution was injected into the system. The concentration of the polymer in the eluent was monitored using an evaporative light scattering detector. The molecular weights presented in the examples are relative to linear polystyrene standards.

Hexene co-monomer content in ethylene-hexene copolymer samples was determined by infrared spectroscopic analysis. Samples for infrared analysis were prepared by depositing the stabilized polymer solution onto a silanized wafer (Part number S10860, Symyx). By this method, approximately between 0.08 and 0.2 mg of polymer is deposited on the wafer cell. The samples were subsequently analyzed on a Brucker Vortex 70 FTIR spectrometer equipped with Pikes's MappIR specular reflectance sample accessory. Spectra, covering a spectral range of 4800 $cm^{-1}$ to 500 $cm^{-1}$, were collected at a 4 $cm^{-1}$ resolution with 32 scans. For ethylene-1-octene copolymers, the wt. % comonomer is determined via measurement of the methyl deformation band having a left edge of 1382 $cm^{-1}$ and a right edge of 1377 $cm^{-1}$. The peak height of this band is normalized by the combination and overtone band having a left edge of 4340 $cm^{-1}$ and a right edge of 4300 $cm^{-1}$, which corrects for path length differences. The normalized peak height is correlated to individual calibration curves from $^{13}C$ NMR data to predict the wt. % co-monomer content within a concentration range of ~2 to 35 wt. %. For hexane, the calibration range is 1.03-18.31%. Typically, $R^2$ correlations of 0.98 or greater are achieved.

Differential Scanning calorimetry (DSC) measurements on the high-throughput samples were performed on a TA-Q100 instrument to determine the melting point of the polymers. Samples were pre-annealed at 220° C. for 15 minutes in a $N_2$-purged oven and then allowed to cool to room temperature overnight. The samples were then heated to 220° C. at a rate of 100° C./minutes and then cooled at a rate of 50° C./minutes Melting points and crystallinity were determined during the heating period. Larger scale polymer preparations were analyzed similarly (Example B).

Polymerization conditions and characterization data for the high-throughput polymerizations are summarized in Table 1 below.

TABLE 1

| Catalyst | $H_2$ (ppm) | Hexene (μL) | Activity (kg/mol*h) | Mw (g/mol) | (Mw/Mn) | Wt. % hexene | Tm (° C.) |
|---|---|---|---|---|---|---|---|
| SMAO-8 | 0 | 300 | 6,555 | 567,500 | 2.11 | 13.50 | 115.34 |
|  | 300 | 300 | 3,555 | 326,060 | 2.07 | 13.57 | 115.34 |
|  | 0 | 180 | 26,154 | 599,414 | 2.01 | 8.61 | 114.11 |
|  | 300 | 180 | 14,355 | 363,117 | 1.94 | 8.86 | 114.11 |
|  | 0 | 180 | 46,823 | 577,727 | 1.97 | 9.64 | 113.51 |
|  | 300 | 180 | 20,952 | 401,811 | 1.85 | 9.35 | 113.51 |
|  | 0 | 60 | 55,419 | 451,748 | 2.15 | 4.60 | 120.03 |
|  | 300 | 60 | 41,598 | 308,488 | 1.98 | 4.80 | 120.03 |
|  | 0 | 60 | 55,204 | 464,228 | 2.06 | 3.91 | 120.02 |
|  | 300 | 60 | 38,353 | 361,263 | 1.89 | 4.97 | 120.02 |
|  | 0 | 30 | 40,499 | 414,699 | 2.46 | 2.17 | 125.77 |
|  | 300 | 30 | 33,449 | 290,718 | 2.02 | 1.56 | 125.77 |
| SMAO-9 | 0 | 300 | — | — | — | — | — |
|  | 300 | 300 | 1,778 | 377,039 | 2.02 | 14.61 | — |
|  | 0 | 180 | — | — | — | — | — |
|  | 300 | 180 | 6,000 | 417,452 | 1.93 | 8.64 | — |
|  | 0 | 180 | — | — | — | — | — |
|  | 300 | 180 | 6,554 | 433,207 | 2.07 | 8.74 | — |
|  | 0 | 60 | — | — | — | — | — |
|  | 300 | 60 | 22,957 | 330,796 | 2.04 | 6.28 | — |
|  | 0 | 60 | 30,420 | 498,068 | 2.06 | 4.11 | — |
|  | 300 | 60 | 22,059 | 326,600 | 1.93 | 5.07 | — |
|  | 0 | 30 | 28,728 | 412,895 | 2.28 | 2.39 | 125.80 |
|  | 300 | 30 | 21,682 | 307,911 | 2.06 | 1.19 | 125.80 |
| SMAO-10 | 0 | 300 | 2,889 | 758,067 | 1.90 | 11.47 | 112.86 |
|  | 300 | 300 | 3,222 | 381,552 | 2.08 | 13.62 | 112.86 |
|  | 0 | 180 | 12,311 | 600,327 | 1.91 | 8.48 | 113.99 |
|  | 300 | 180 | 11,705 | 385,555 | 1.91 | 7.72 | 113.99 |
|  | 0 | 180 | 13,118 | 690,416 | 1.77 | 9.30 | 113.18 |
|  | 300 | 180 | 12,629 | 411,766 | 1.93 | 7.55 | 113.18 |
|  | 0 | 60 | 17,404 | 431,115 | 1.89 | 2.36 | 122.81 |
|  | 300 | 60 | 17,955 | 325,073 | 1.93 | 1.57 | 122.81 |
|  | 0 | 60 | 16,707 | 442,277 | 2.34 | 3.08 | 122.99 |
|  | 300 | 60 | 20,552 | 292,379 | 1.94 | 1.51 | 122.99 |
|  | 0 | 30 | 18,433 | 425,446 | 2.14 | 0.51 | 127.40 |
|  | 300 | 30 | 20,660 | 280,989 | 2.01 | −0.24 | 127.4 |

TABLE 1-continued

| Catalyst | $H_2$ (ppm) | Hexene (μL) | Activity (kg/mol*h) | Mw (g/mol) | (Mw/Mn) | Wt. % hexene | Tm (° C.) |
|---|---|---|---|---|---|---|---|
| SMAO-11 | 0 | 300 | 4,554 | 658,477 | 1.85 | 12.95 | 113.39 |
| | 300 | 300 | 3,444 | 364,281 | 2.01 | 13.74 | 113.39 |
| | 0 | 180 | 19,549 | 610,073 | 2.03 | 8.73 | 113.50 |
| | 300 | 180 | 10,781 | 369,086 | 1.97 | 7.95 | 113.50 |
| | 0 | 180 | 17,886 | 586,992 | 2.22 | 9.57 | 113.65 |
| | 300 | 180 | 11,791 | 368,645 | 2.10 | 8.53 | 113.65 |
| | 0 | 60 | 19,803 | 454,802 | 2.14 | 3.30 | 122.28 |
| | 300 | 60 | 18,548 | 305,271 | 1.98 | 3.12 | 122.15 |
| | 0 | 60 | 19,895 | 444,653 | 2.31 | 3.85 | 122.15 |
| | 300 | 60 | 18,785 | 316,431 | 1.77 | 2.32 | 122.15 |
| | 0 | 30 | 18,746 | 383,938 | 2.18 | 1.62 | 126.92 |
| | 300 | 30 | 17,515 | 286,274 | 1.85 | −0.49 | 126.92 |
| SMAO-1 | 0 | 300 | 3,333 | 1,449,014 | 3.00 | 12.51 | 96.34 |
| | 300 | 300 | 2,666 | 489,160 | 2.66 | 11.36 | 97.52 |
| | 0 | 180 | 10,433 | 1,531,905 | 2.77 | 8.13 | 111.69 |
| | 300 | 180 | 7,444 | 512,171 | 2.31 | 7.33 | 115.51 |
| | 0 | 180 | 7,585 | 1,716,491 | 2.66 | 8.98 | 110.40 |
| | 300 | 180 | 6,221 | 551,145 | 2.38 | 7.69 | 114.70 |
| | 0 | 60 | 11,184 | 1,577,846 | 2.54 | 2.49 | 122.18 |
| | 300 | 60 | 11,244 | 434,062 | 2.22 | 2.05 | 125.39 |
| | 0 | 60 | 12,614 | 1,487,781 | 2.39 | 2.84 | 121.88 |
| | 300 | 60 | 13,648 | 442,714 | 2.25 | 1.79 | 125.25 |
| | 0 | 30 | 11,249 | 1,500,947 | 2.85 | 2.11 | 125.73 |
| | 300 | 30 | 9,555 | 434,622 | 2.26 | 0.70 | 128.98 |
| SMAO-3 | 0 | 300 | 6,885 | 1,715,573 | 3.08 | 12.07 | 95.36 |
| | 300 | 300 | 4,999 | 665,092 | 2.68 | 11.92 | 112.74 |
| | 0 | 180 | 17,080 | 1,663,123 | 2.74 | 9.60 | 108.73 |
| | 300 | 180 | 11,173 | 547,668 | 2.37 | 7.86 | 114.50 |
| | 0 | 180 | 19,450 | 1,822,620 | 2.36 | 9.49 | 109.23 |
| | 300 | 180 | 13,425 | 565,679 | 2.35 | 7.99 | 114.50 |
| | 0 | 60 | 18,199 | 1,446,680 | 2.63 | 3.93 | 119.79 |
| | 300 | 60 | 19,576 | 482,788 | 2.24 | 2.73 | 123.70 |
| | 0 | 60 | 21,876 | 1,410,596 | 2.77 | 3.66 | 120.01 |
| | 300 | 60 | 20,131 | 471,006 | 2.22 | 2.41 | 123.69 |
| | 0 | 30 | 17,279 | 1,421,457 | 2.33 | 1.77 | 125.70 |
| | 300 | 30 | 17,349 | 438,814 | 2.23 | 0.92 | 128.25 |
| SMAO-4 | 0 | 300 | 12,506 | 1,665,386 | 2.32 | 12.75 | 94.5 |
| | 300 | 300 | 8,331 | 611,457 | 2.19 | 11.81 | 94.5 |
| | 0 | 180 | 34,228 | 2,010,452 | 2.35 | 9.09 | 108.60 |
| | 300 | 180 | 19,453 | 610,718 | 2.02 | 7.76 | 108.60 |
| | 0 | 180 | 34,174 | 1,944,898 | 2.70 | 8.53 | 109.21 |
| | 300 | 180 | 26,466 | 735,351 | 1.92 | 8.13 | 109.21 |
| | 0 | 60 | 36,792 | 1,487,142 | 2.10 | 3.89 | 120.70 |
| | 300 | 60 | 33,252 | 518,740 | 2.04 | 2.07 | 120.70 |
| | 0 | 60 | 37,666 | 1,534,392 | 2.33 | 3.63 | 119.99 |
| | 300 | 60 | 39,193 | 508,060 | 2.03 | 2.10 | 119.99 |
| | 0 | 30 | 34,984 | 1,283,505 | 2.25 | 1.58 | 125.36 |
| | 300 | 30 | 32,852 | 462,374 | 1.85 | 1.65 | 125.36 |

EXAMPLE B: Larger Scale Ethylene-Hexene Polymerization using catalyst 3. Ethylene-hexene polymerization was performed in a 7 foot tall gas-phase fluidized bed reactor with a 4 foot tall 6" diameter body and a 3 foot tall 10" diameter expanded section. Cycle and feed gases were fed into the reactor body through a perforated distributor plate, and the reactor was controlled at 300 psi and 70 mol % ethylene. The reactor temperature was maintained by heating the cycle gas. The supported catalyst 3 was fed as a 10 wt. % slurry in Sono Jell® from Sonneborn (Parsippany, N.J.). The slurry was delivered to the reactor using nitrogen and isopentane feeds in a ⅛" diameter catalyst probe. Polymer was collected from the reactor as necessary to maintain the desired bed weight. Average process conditions and data for the polymer collection are shown in Table 2.

SMAO-Supported Catalyst 3 Preparation. A 60.0 gram amount of ES70 875C SMAO to a Celestir vessel with 150 mL of toluene. Next, catalyst, la 2.15 gram amount, was added to the slurry which was stirred for 3 hours. The slurry was then filtered, washed with toluene (1×10 mL) and then hexane (2×10 mL). The supported catalyst was then dried under vacuum overnight.

TABLE 2

| PROCESS DATA | |
|---|---|
| $H_2$ concentration (ppm) | 385 |
| $C_6$:$C_2$ ratio (mol. %:mol %) | 0.0151 |
| $C_6$ co-monomer concentration (mol. %) | 1.06 |
| $C_2$ monomer concentration (mol. %) | 70.1 |
| $C_6$ co-monomer/$C_2$ flow ratio | 0.051 |
| $C_2$ monomer flow (g/hr) | 1448 |
| Pressure (psig) | 298 |
| Temperature (° C.) | 85 |
| Avg. bed weight (g) | 2359 |
| Residence time (hr) | 5.7 |
| Catalyst feed rate (g/hr) | 0.186 |
| Catalyst activity (g polymer/g catalyst) | 2236 |

TABLE 3

| PRODUCT DATA | |
|---|---|
| Melt Index, MI (dg/min) | 0.90 |
| High Load Melt Index, HLMI (dg/min) | 21.72 |
| HLMI:MI Ratio | 24.14 |
| Density (g/cc) | 0.9204 |
| Bulk Density (g/cc) | 0.4193 |
| Mw (g/mol) | 118,872 |
| Mn (g/mol) | 20,232 |
| Mz (g/mol) | 343,982 |
| Mz/Mn | 17.0 |
| Mw/Mn | 5.88 |
| Mz/Mw | 2.89 |
| g' (vis) | 0.989 |
| Hexene (wt. %) | 7.21 |

The polymer product obtained from Example B showed a broad orthogonal composition distribution. The FIGURE shows the 4D GPC of the polymer product obtained. As shown, the hexene weight percentage increased as the polymer molecular weight increased. Broad Orthogonal Composition Distribution means that the co-monomer of a copolymer is incorporated predominantly in the high molecular weight chains or species of an olefin polymer or composition. This can be indicated by the distribution of short chain branches which can be measured using Temperature Raising Elution Fractionation (TREF) in connection with a Light Scattering (LS) detector to determine the weight average molecular weight of the molecules eluted from the TREF column at a given temperature. The combination of TREF and LS (TREF-LS) yields information about the breadth of the composition distribution and whether the co-monomer content increases, decreases, or is uniform across the chains of different molecular weights of polymer chains. BOCD been described, for example, in U.S. Pat. No. 8,378,043, Col. 3, line 34, bridging Col. 4, line 19, and U.S. Pat. No. 8,476,392, line 43, bridging Col. 16, line 54.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

One or more illustrative embodiments are presented herein. Not all features of a physical implementation are described or shown in this application for the sake of clarity. It is understood that in the development of a physical embodiment of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for one of ordinary skill in the art and having benefit of this disclosure.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

What is claimed is:

1. A metallocene compound represented by the formula:

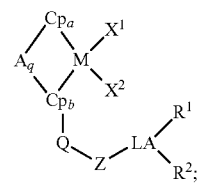

wherein:
Cp$_a$ and Cp$_b$ are optionally-substituted cyclopentadienyl rings;
A is an optional bridging group linking Cp$_a$ to Cp$_b$;
q is zero or 1;

Q is O, O(CR³R⁴)$_m$, (CR³R⁴)$_m$O, or (CR³R⁴)$_m$, and m is an integer ranging from 0 to about 18;

Z is (CR³R⁴)$_2$;

LA is a Lewis acid;

M is a transition metal haptically bonded to Cp$_a$ and Cp$_b$;

X¹ and X² are independently R⁵ or OR⁵;

wherein R¹ and R² are independently selected from a first optionally-substituted hydrocarbyl group having 1 to about 20 carbon atoms, the first optionally-substituted hydrocarbyl group being linear, branched, saturated, unsaturated, aliphatic, aromatic, cyclic, or acyclic;

wherein R³ and R⁴ are independently selected from the group consisting of H, halogen, and second optionally-substituted hydrocarbyl group having 1 to about 20 carbon atoms, the second optionally-substituted hydrocarbyl group being linear, branched, saturated, unsaturated, aliphatic, aromatic, cyclic, or acyclic; and wherein when X¹ or X² is R⁵, then R⁵ is alkyl, perfluoroalkyl, or perfluoroaryl, and when X¹ or X² is OR⁵, then R⁵ in the OR⁵ is alkyl, aryl, perfluoroalkyl, or perfluoroaryl.

2. The composition of claim 1, wherein M is Zr or Hf, and LA is Al or B.

3. The composition of claim 2, wherein q is 1, and A is an alkylene or a silylene group.

4. The composition of claim 3, wherein X¹ and X² are pentafluorophenoxy.

5. The composition of claim 1, wherein q is 1 and A is SiR⁶R⁷; wherein R⁶ and R⁷ are independently a third optionally-substituted hydrocarbyl group having 1 to about 20 carbon atoms, the third optionally-substituted hydrocarbyl group being linear, branched, saturated, unsaturated, aliphatic, aromatic, cyclic, acyclic.

6. The composition of claim 5, wherein X¹ and X² are pentafluorophenoxy.

7. The composition of claim 5, wherein Q is (CH$_2$)$_m$ and Z is (CH$_2$)$_2$, and m is 0, 1, 2, 3, 4, 5, 6, 7, 8, 9, 10, 11, or 12.

8. The composition of claim 7, wherein m ranges from 0, 1, 2, 3, or 4.

9. The composition of claim 8, wherein M is Hf.

10. The composition of claim 2, wherein Q is (CH$_2$)$_m$ and Z is (CH$_2$)$_2$, and m is 0, 1, 2, 3, 4, 5, 6, 7, 8, 9, 10, 11, or 12.

11. The composition of claim 10, wherein m is 0, 1, 2, 3 or 4.

12. The composition of claim 10, wherein X¹ and X² are pentafluorophenoxy.

13. The composition of claim 10, wherein M is Hf.

14. A catalyst composition comprising: at least one activator; and a metallocene compound represented by the formula:

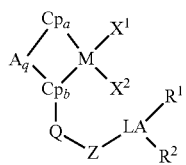

or a reaction product of the metallocene compound with the at least one activator;

wherein:

Cp$_a$ and Cp$_b$ are optionally-substituted cyclopentadienyl rings;

q is zero or 1;

A is an optional bridging group linking Cp$_a$ to Cp$_b$;

Q is O, O(CR³R⁴)$_m$, (CR³R⁴)$_m$O, or (CR³R⁴)$_m$, and m is an integer ranging from 0 to about 18;

Z is (CR³R⁴)$_2$;

LA is a Lewis acid;

M is a transition metal haptically bonded to Cp$_a$ and Cp$_b$;

X¹ and X² are independently R⁵ or OR⁵;

wherein R¹ and R² are independently selected from a first optionally-substituted hydrocarbyl group having 1 to about 20 carbon atoms, the first optionally-substituted hydrocarbyl group being linear, branched, saturated, unsaturated, aliphatic, aromatic, cyclic, or acyclic;

wherein R³ and R⁴ are independently selected from the group consisting of H, halogen, and a second optionally-substituted hydrocarbyl group having 1 to about 20 carbon atoms, the second optionally-substituted hydrocarbyl group being linear, branched, saturated, unsaturated, aliphatic, aromatic, cyclic, or acyclic; and wherein when X¹ or X² is R⁵, then R⁵ is alkyl, perfluoroalkyl, or perfluoroaryl, and when X¹ or X² is OR⁵, then R⁵ in the OR⁵ is alkyl, aryl, perfluoroalkyl, or perfluoroaryl.

15. The catalyst composition of claim 14, wherein the at least one activator comprises an alumoxane.

16. The catalyst composition of claim 14, wherein the at least one activator comprises methylalumoxane.

17. The catalyst composition of claim 14, wherein the catalyst composition is disposed on a solid support.

18. The catalyst composition of claim 15, wherein M is Zr or Hf, and LA is Al or B.

19. The catalyst composition of claim 18, wherein q is 1 and is an alkylene or a silylene group.

20. The catalyst composition of claim 19, wherein X¹ and X² are pentafluorophenoxy.

21. The catalyst composition of claim 14, wherein q is 1 and A is SiR⁶R⁷; wherein R⁶ and R⁷ are independently third optionally-substituted hydrocarbyl group having 1 to about 20 carbon atoms, the third optionally-substituted hydrocarbyl group being linear, branched, saturated, unsaturated, aliphatic, aromatic, cyclic, or acyclic.

22. The catalyst composition of claim 21, wherein X¹ and X² are pentafluorophenoxy.

23. The catalyst composition of claim 21, wherein Q is (CH$_2$)$_m$ and Z is (CH$_2$)$_2$, and m is 0, 1, 2, 3, 4, 5, 6, 7, 8, 9, 10, 11, or 12.

24. The catalyst composition of claim 23, wherein m is 0, 1, 2, 3, or 4.

25. The catalyst composition of claim 21, wherein M is Hf.

26. The catalyst composition of claim 15, wherein Q is (CH$_2$)$_m$ and Z is (CH$_2$)$_2$, and m is 0, 1, 2, 3, 4, 5, 6, 7, 8, 9, 10, 11, or 12.

27. The catalyst composition of claim 26, wherein m is 0, 1, 2, 3, or 4.

28. The catalyst composition of claim 26, wherein X¹ and X² are pentafluorophenoxy.

29. The catalyst composition of claim 26, wherein M is Hf.

30. A method comprising: providing an olefinic feed; and contacting the catalyst composition of claim 14 with the olefinic feed under polymerization reaction conditions.

31. The method of claim 30, wherein the polymerization reaction conditions include hydrogen gas.

32. The method of claim 30, wherein the catalyst composition is disposed upon a solid support.

33. The catalyst composition of claim 15, wherein the catalyst composition is disposed on a solid support.

34. The method of claim 30, wherein: the at least one activator comprises an alumoxane; the catalyst composition is disposed on a solid support; M is Zr or Hf, LA is Al or B.

35. The method of claim 34 wherein $X^1$ and $X^2$ are pentafluorophenoxy.

36. The method of claim 34 wherein q is 1, A is an alkylene or a silylene group and Q is $(CH_2)_m$ and Z is $(CH_2)_2$, and m is 0, 1, 2, 3, 4, 5, 6, 7, 8, 9, 10, 11, or 12.

37. The method of claim 34, wherein q is 1 and A is $SiR^6R^7$; wherein $R^6$ and $R^7$ are independently a third optionally-substituted hydrocarbyl group having 1 to about 20 carbon atoms, the third optionally-substituted hydrocarbyl group being linear, branched, saturated, unsaturated, aliphatic, aromatic, cyclic, or acyclic.

38. A metallocene compound represented by Formulas 6, 7, 8 and 9, wherein M=Zr or Hf, LA is Al or B; and $R^1$ and $R^2$ are independently selected from an optionally-substituted hydrocarbyl group having 1 to about 20 carbon atoms, the optionally-substituted hydrocarbyl group being linear, branched, saturated, unsaturated, aliphatic, aromatic, cyclic, or acyclic:

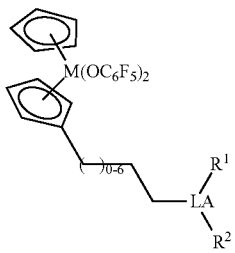

Formula 6

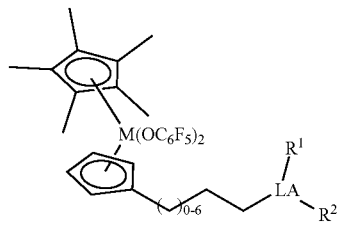

Formula 7

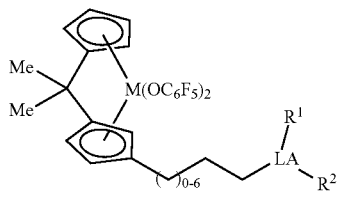

Formula 8

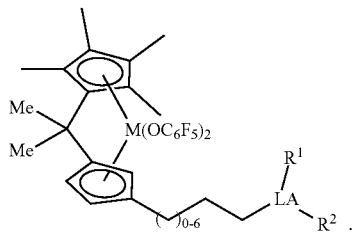

Formula 9

39. The metallocene of claim 38, wherein M is Hf, LA is Al, and $R^1$ and $R^2$ are isobutyl.

40. The metallocene of claim 38, where in M is Hf, LA is B, and $R^1$ and $R^2$ are pentafluorophenyl.

* * * * *